(12) United States Patent
Inoue

(10) Patent No.: US 11,416,181 B2
(45) Date of Patent: Aug. 16, 2022

(54) CLIENT TERMINAL, METHOD, AND MEDIUM THAT CONTROL COMMUNICATION WITH DEVICES WITH FAILED CERTIFICATES

(71) Applicant: CANON KABUSHIKI KAISHA, Tokyo (JP)

(72) Inventor: Go Inoue, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/022,469

(22) Filed: Sep. 16, 2020

(65) Prior Publication Data

US 2021/0096785 A1    Apr. 1, 2021

(30) Foreign Application Priority Data

Sep. 27, 2019 (JP) .............................. JP2019-177783

(51) Int. Cl.
| | |
|---|---|
| *G06F 3/12* | (2006.01) |
| *H04N 1/44* | (2006.01) |
| *H04L 9/32* | (2006.01) |
| *H04L 9/40* | (2022.01) |
| *G06F 21/60* | (2013.01) |

(52) U.S. Cl.
CPC .......... *G06F 3/1204* (2013.01); *G06F 3/1231* (2013.01); *G06F 21/608* (2013.01); *H04L 9/3268* (2013.01); *H04L 63/0428* (2013.01); *H04N 1/4433* (2013.01); *H04N 1/4486* (2013.01); *G06F 3/1287* (2013.01)

(58) Field of Classification Search
None
See application file for complete search history.

(56) References Cited

U.S. PATENT DOCUMENTS

| | | | | |
|---|---|---|---|---|
| 8,589,676 B2 * | 11/2013 | Murakawa | ............ | H04L 9/3265 |
| | | | | 713/156 |
| 2013/0061041 A1 * | 3/2013 | Inoue | ...................... | G06F 21/44 |
| | | | | 713/156 |
| 2016/0373262 A1 * | 12/2016 | Shearer | ................. | G06F 16/951 |
| 2017/0250825 A1 * | 8/2017 | Hokiyama | ............ | H04L 9/3268 |
| 2018/0210684 A1 * | 7/2018 | Kato | ..................... | G06F 3/1232 |

FOREIGN PATENT DOCUMENTS

JP        2015187791 A        10/2015

\* cited by examiner

*Primary Examiner* — Lennin R Rodriguezgonzalez
(74) *Attorney, Agent, or Firm* — Rossi, Kimms & McDowell LLP

(57) ABSTRACT

An information processing apparatus is provided. The apparatus performs operations comprising searching for devices connected to a network; displaying a screen for selecting a device to be used from among devices discovered through the search; when the device selected through the screen is a device which can perform encrypted communication and for which a result of processing for verifying a certificate received from the device is a failure, inquiring with a user as to whether to allow or reject communication with that device; and obtaining information of the selected device by communicating with the device when a user operation for allowing the communication has been made in response to the inquiring, and performing control for not establishing encrypted communication with the selected device when a user operation for rejecting the communication has been made.

13 Claims, 24 Drawing Sheets

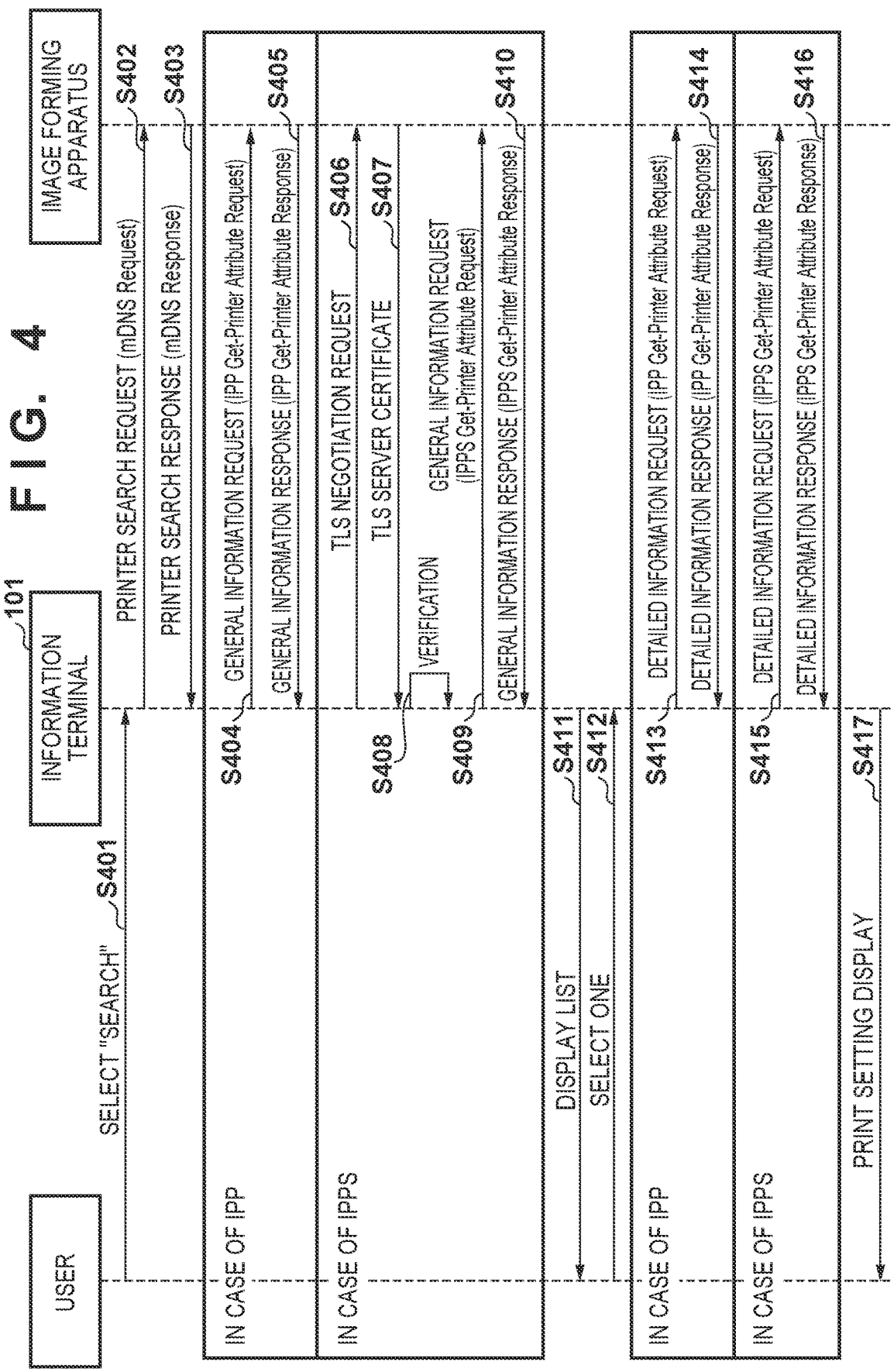

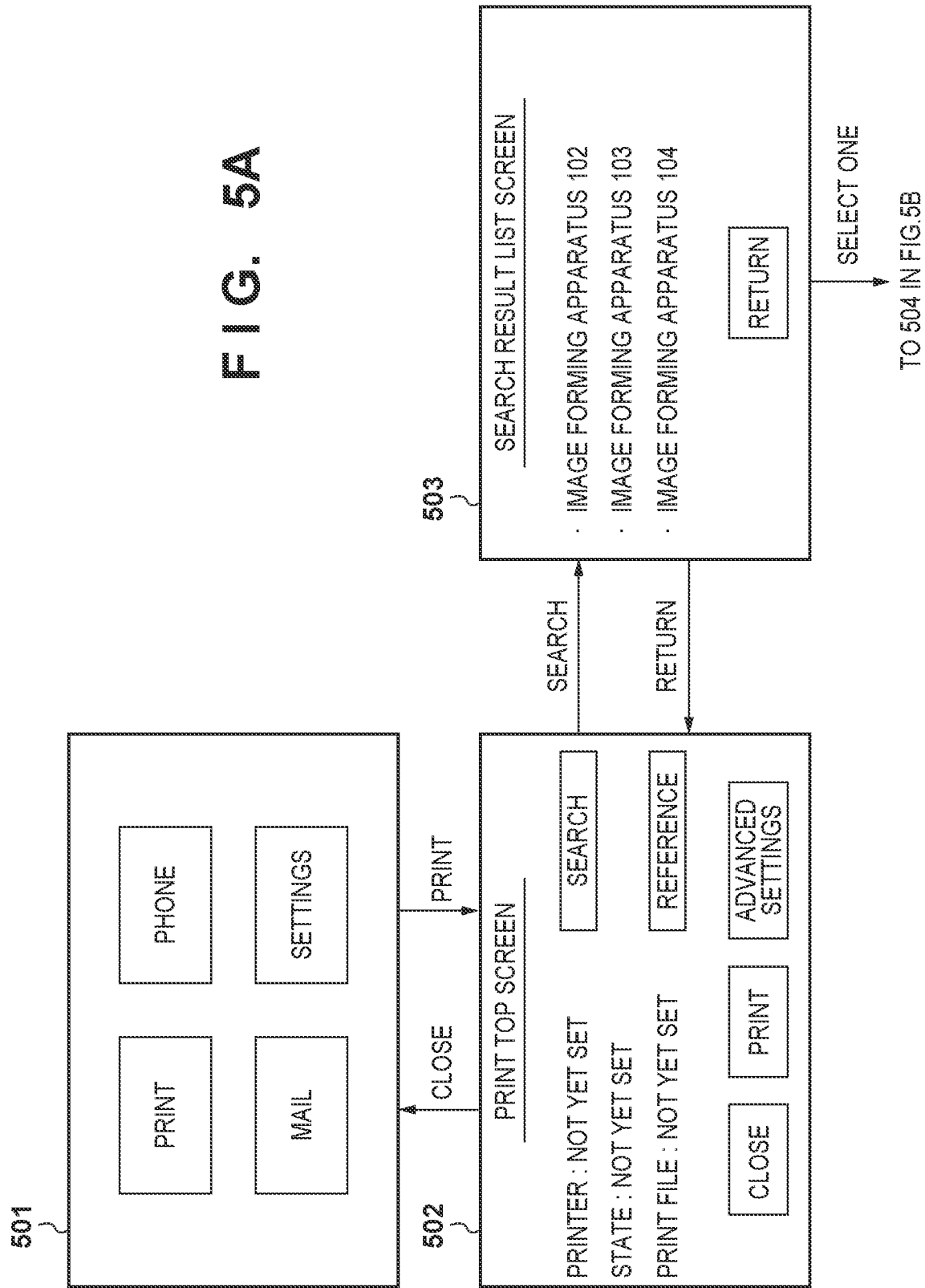

FIG. 6

Sequence diagram with participants: USER, INFORMATION TERMINAL 101, IMAGE FORMING APPARATUS.

- SAME AS S401 TO S405
- IN CASE OF IPPS:
  - S601: TLS NEGOTIATION REQUEST (Information Terminal → Image Forming Apparatus)
  - S602: TLS SERVER CERTIFICATE (Image Forming Apparatus → Information Terminal)
  - S603: VERIFICATION
  - S604: CONFIRMATION SCREEN (Information Terminal → User)
  - S605: ALLOW (User → Information Terminal)
  - S606: GENERAL INFORMATION REQUEST (IPPS Get-Printer Attribute Request) (Information Terminal → Image Forming Apparatus)
  - S607: GENERAL INFORMATION RESPONSE (IPPS Get-Printer Attribute Response) (Image Forming Apparatus → Information Terminal)
  - S608: DISPLAY LIST (Information Terminal → User)
- SAME AS S412 ONWARD

FIG. 8

```
NAME: SERVER CERTIFICATE 801                              ~801
CN: Printer103.com
VALIDITY PERIOD: 2011/11/18 – 2025/5/7
ISSUER: Global Sign
SIGNATURE ALGORITHM: SHA256RSA
CERTIFICATION PW: Global Sign
              |---Global Sign – G2
                    |--- Printer103.com
PUBLIC KEY: asdezzxx...
```

```
NAME: SERVER CERTIFICATE 802                              ~802
CN: Printer104.com
VALIDITY PERIOD: 2011/5/20 – 2025/12/24
ISSUER: Printer104.com
SIGNATURE ALGORITHM: SHA256RSA
CERTIFICATION PW: Printer104.com
PUBLIC KEY: 3afadsaxx...
```

```
NAME: CA CERTIFICATE 803                                  ~803
CN: GlobalSign.com
VALIDITY PERIOD: 2011/11/18 – 2025/5/7
ISSUER: Global Sign
SIGNATURE ALGORITHM: SHA256RSA
CERTIFICATION PW: GlobalSign.com
PUBLIC KEY: fa93afazzxx...
```

FIG. 9

SEARCH REQUEST DATA
- mDNS Query
- Queries
  _printer._tcp.local : type PTR, class IN, "QM" question

~901

SEARCH RESPONSE DATA
- mDNS Query Response
- Answers
  _ipp._tcp.local : type PTR, class IN, printer103.com._ipp._tcp.local
- Additional Records
  http://printer103.com:631/ipp/print
  https://printer103.com:443/ipp/print

~902

GENERAL INFORMATION ACQUISITION REQUEST DATA
- IPP Get-Printer-Attribute Requests
- Requested-attributes
  printer-name
  printer-state

~903

GENERAL INFORMATION ACQUISITION RESPONSE DATA
- IPP Get-Printer-Attribute Response
- Printer-description-attributes
  printer-name: printer103.com
  printer-state:idle

~904

DETAILED INFORMATION ACQUISITION REQUEST DATA
- IPP Get-Printer-Attribute Requests
- Requested-attributes
  printer-name, printer-state, copies-supported, color-supported
  print-quality-supported, document-format-supported
  number-up-supported

~905

DETAILED INFORMATION ACQUISITION RESPONSE DATA
- IPP Get-Printer-Attribute Response
- Printer-description-attributes
  printer-name: printer103.com
  printer-state:idle
  copies-support : 1 – 999
  color-support : color, monochrome
  print-quality-support : high , draft
  document-format-support : pdf, pwg-raster
  number-up-support : 1,2,4,8,16

~906

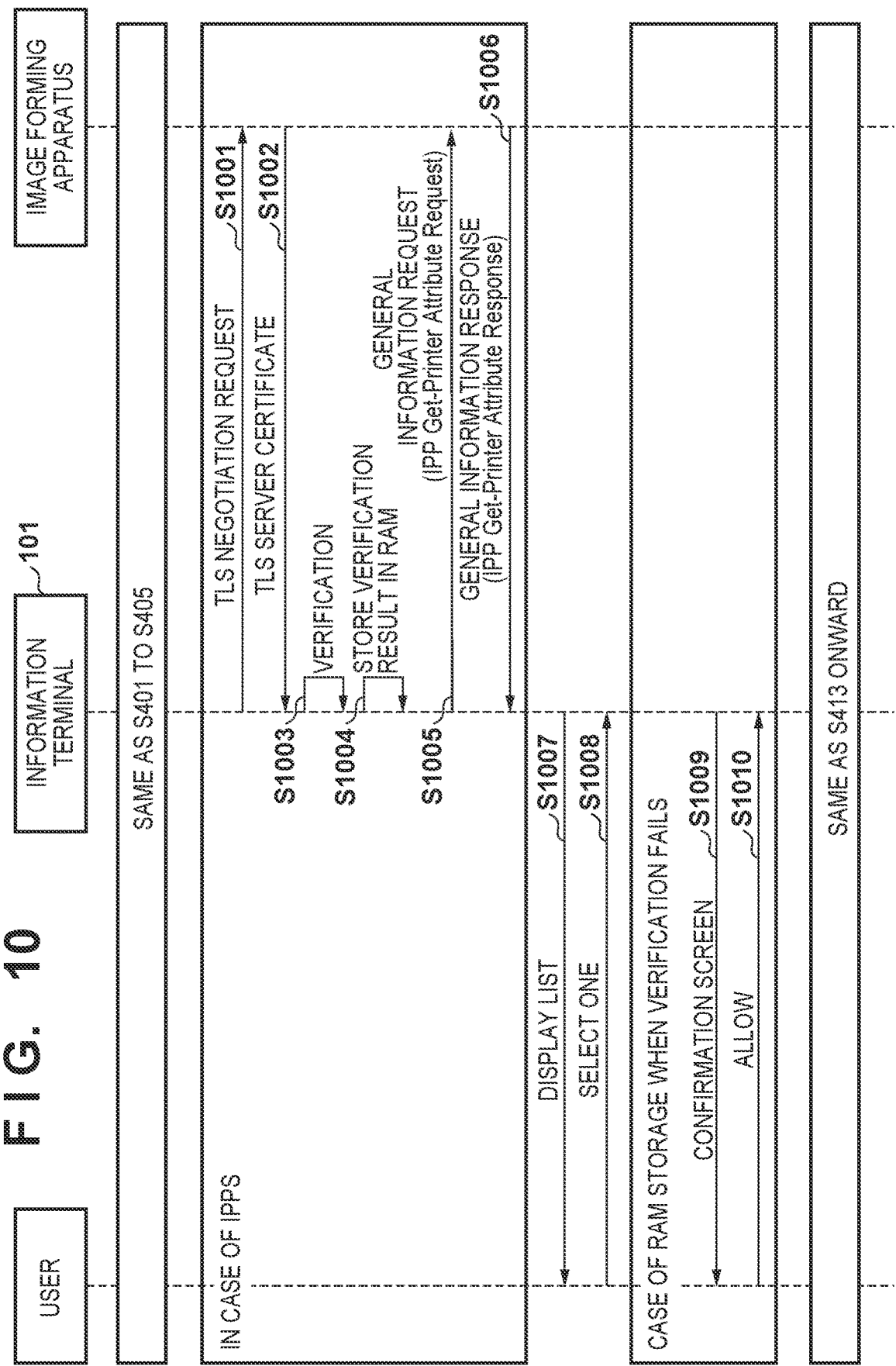

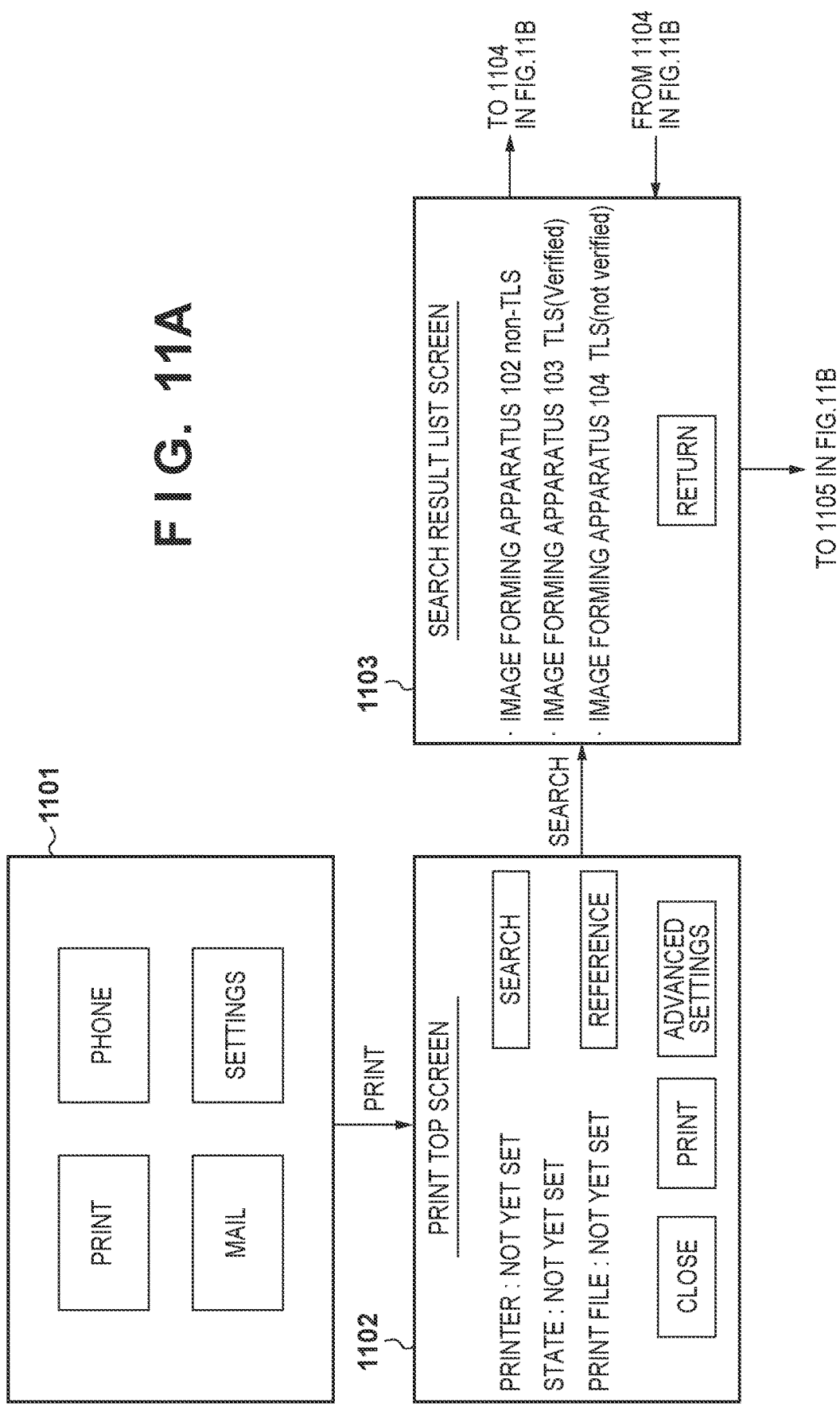

FIG. 11B

1104 — SEARCH RESULT LIST SCREEN

FAILED TO VERIFY SERVER CERTIFICATE OF IMAGE FORMING APPARATUS 104.
REASON:
NO RELEVANT CA CERTIFICATE.
ALLOW CONNECTION?

[ALLOW CONNECTION] [REJECT CONNECTION]

FROM 1103 IN FIG.11A: SELECT APPARATUS ABLE NOT TO BE VERIFIED
TO 1103 IN FIG.11A: REJECT CONNECTION
ALLOW CONNECTION →

1105 — PRINT TOP SCREEN

PRINTER : IMAGE FORMING APPARATUS 104
STATE : Idle
PRINT FILE : data1.pdf

[SEARCH] [REFERENCE]
[CLOSE] [PRINT] [ADVANCED SETTINGS]

FROM 1103 IN FIG.11A: Non-TLS / SELECT APPARATUS ABLE TO BE VERIFIED

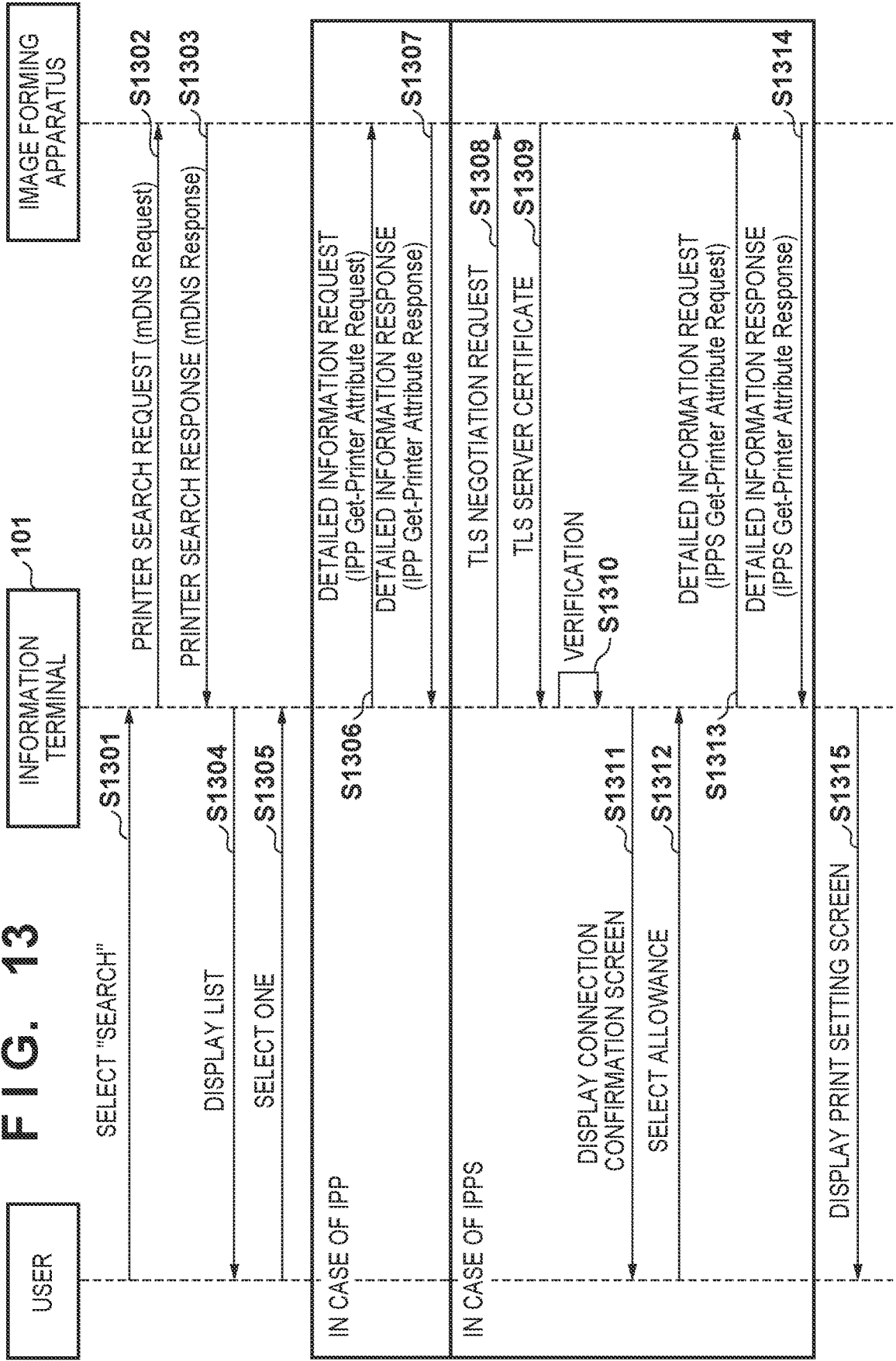

FIG. 16

| USER | INFORMATION TERMINAL 101 | IMAGE FORMING APPARATUS |

SAME AS S401-S405, S1001-S1003

IN CASE THERE IS FAILURE OF VERIFICATION — CONFIRMATION SCREEN S1601

IN CASE OF REJECTION — SELECT REJECTION S1602

S1603 VERIFICATION

IN CASE OF ALLOWANCE — SELECT ALLOWANCE S1604

DISPLAY LIST S1606

SELECT ONE S1607

SAME AS S413 ONWARD

CLIENT TERMINAL, METHOD, AND MEDIUM THAT CONTROL COMMUNICATION WITH DEVICES WITH FAILED CERTIFICATES

BACKGROUND OF THE INVENTION

Field of the Invention

The present invention relates to an information processing apparatus that, for example, searches for a device, a device search method, and a medium.

Description of the Related Art

In recent years, techniques for printing with ease, regardless of the brand of an image forming apparatus and without requiring additional software or drivers to be installed, are becoming widespread. For example, printing applications such as Mopria and IPP-Everywhere are spreading (e.g., Japanese Patent Laid-Open No. 2015-187791). With such a printing application, a user uses an information terminal in which the printing application is installed to search for an image forming apparatus. The search is performed using a communication protocol such as multicast Domain Name Service (mDNS) or Internet Printing Protocol (IPP). The printing application then displays a list of image forming apparatuses discovered through the search as a search result in an operating unit of the information terminal. The user selects a desired one of the image forming apparatuses from the list, and then obtains more detailed information, prints using IPP, and so on. If the image forming apparatus in question supports IPP communication using Transport Layer Security (TLS), the printing is performed using IPPS.

SUMMARY OF THE INVENTION

The present invention prevents automatic connections to an image forming apparatus having a server certificate which has failed authentication. Additionally, the present invention lightens the burden on a user for confirming connections with image forming apparatuses, while at the same time preventing automatic connections.

The present invention has the following configuration.

That is, according to one aspect of the present invention, provided is an information processing apparatus comprising at least one processor that executes instructions, the instructions, when executed, causing the information apparatus to perform operations comprising: searching for devices connected to a network; displaying a screen for selecting a device to be used from among devices discovered through the search; when the device selected through the screen is a device which can perform encrypted communication and for which a result of processing for verifying a certificate received from the device is a failure, inquiring with a user as to whether to allow or reject communication with that device; and obtaining information of the selected device by communicating with the device when a user operation for allowing the communication has been made in response to the inquiring, and performing control for not establishing encrypted communication with the selected device when a user operation for rejecting the communication has been made.

According to another aspect of the present invention, provided is an information processing apparatus comprising at least one processor that executes instructions, the instructions, when executed, causing the information apparatus to perform operations comprising: starting a search for devices connected to a network upon condition that a predetermined user operation is accepted; displaying a screen for selecting a device to be used from among devices discovered through the search; and when the device discovered through the search is a device which can perform encrypted communication and for which a result of processing for verifying a certificate received from the device is a failure, inquiring with a user as to whether to allow or reject communication with that device, wherein when a response of rejecting communication has been received from the user as a response to the inquiring, wherein the screen is configured to include a display item corresponding to a device for which a result of processing for verifying a certificate is not a failure, and not to include a display item corresponding to a device for which the verification result for the certificate is a failure.

According to one aspect of the present invention, automatic connections to an image forming apparatus having a server certificate which has failed authentication can be prevented. Furthermore, according to another aspect of the present invention, the burden on a user for confirming connections of an image forming apparatus can be lightened.

Further features of the present invention will become apparent from the following description of exemplary embodiments with reference to the attached drawings.

BRIEF DESCRIPTION OF THE DRAWINGS

FIG. 4 is a diagram illustrating an example of a search sequence according to a first embodiment.

FIGS. 5A and 5B illustrate an example of a flow of an operating unit of an information terminal according to the first embodiment.

FIG. 6 is a diagram illustrating an example of a search sequence 2 according to the first embodiment.

FIG. 8 is a diagram illustrating an example of certificate information according to an embodiment.

FIG. 9 is a diagram illustrating an example of communication packet data according to an embodiment.

FIG. 10 is a diagram illustrating an example of a search sequence according to a second embodiment.

FIGS. 11A and 11B illustrate an example of a flow of the operating unit of the information terminal according to the second embodiment.

FIG. 13 is a diagram illustrating an example of a search sequence according to a third embodiment.

FIG. 16 is a diagram illustrating an example of a search sequence according to a fourth embodiment.

DESCRIPTION OF THE EMBODIMENTS

Figure 1:
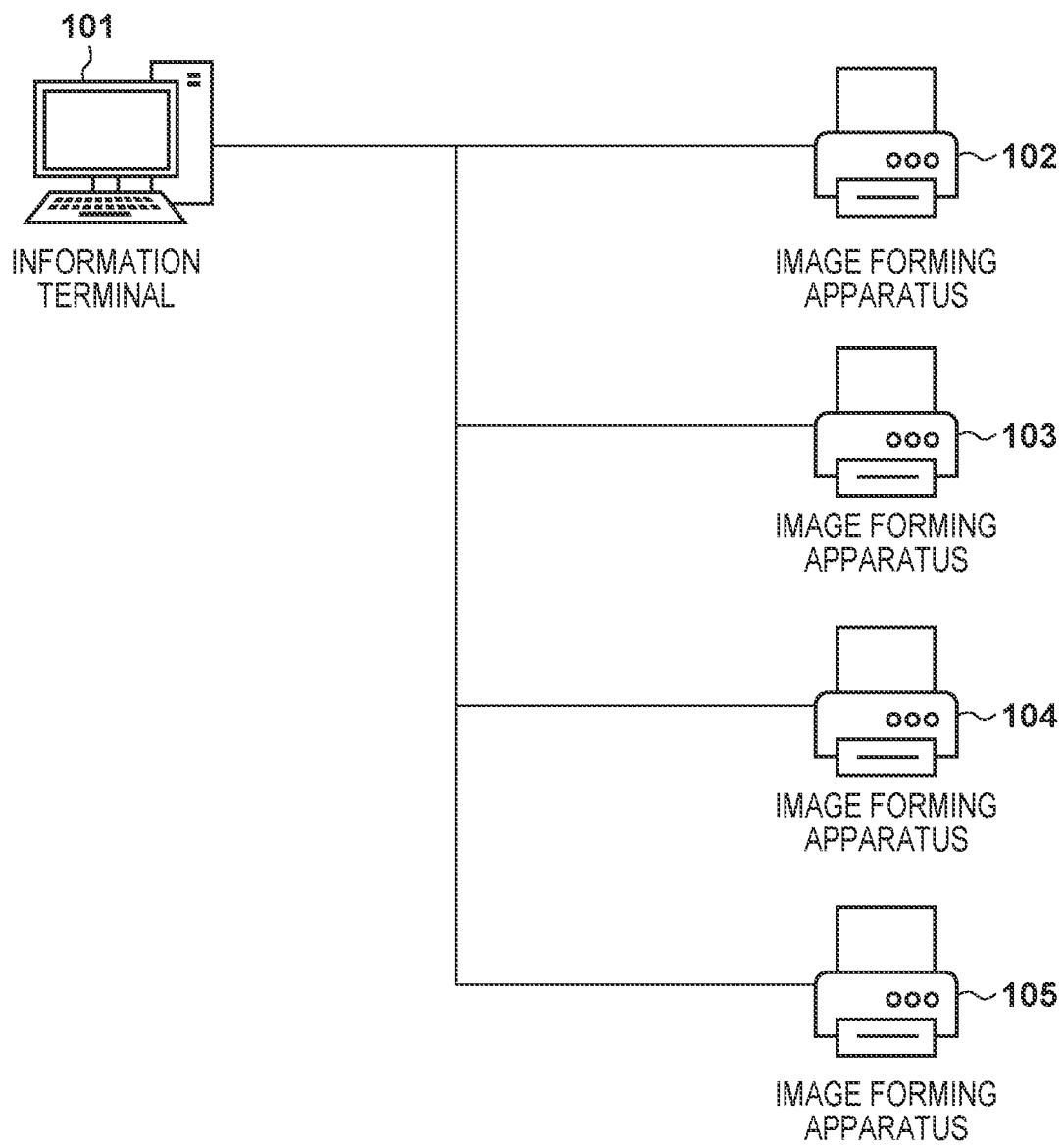
FIG. 1 is an example of a network configuration diagram according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In past printing applications, communication is typically established with an image forming apparatus discovered through a search, without confirming the legitimacy of the communication path, so that printing can be performed through a simple flow of operations. However, with the recent increases in security concerns, there is demand for the legitimacy of communication paths to be confirmed even in communication which is often established over a local network, such as communication between printing applications and image forming apparatuses.

Accordingly, the embodiments provide a technique for confirming the legitimacy of communication even in communication between a printing application and an image forming apparatus and, for a printer whose legitimacy cannot be verified, suppressing the establishment of a connection without confirming a user's intentions. When the communication path provided for printing uses IPP communication encrypted through TLS (IPPS communication), the legitimacy can be verified in the TLS negotiation phase. In this case, the image forming apparatus sends, to an information terminal, a server certificate issued by a server. Next, the information terminal verifies the server certificate received from the image forming apparatus using a Certificate Authority (CA) certificate. According to the embodiments, if the server certificate cannot be specified as legitimate in this verification phase, display control is performed to display a screen which allows the user to select whether to reject the connection or establish the connection. This makes it possible to allow the user to select whether or not to communicate with a printer over a communication path which could not be verified as legitimate, after providing a security warning. This will be described in detail below.

First Embodiment

Network Configuration

FIG. 1 is a diagram illustrating an example of the configuration of a communication system according to embodiments of the present invention. An information terminal 101 is a communication terminal (also called an "information processing apparatus"), such as a smartphone or a desktop computer, which can communicate over a wired LAN or a wireless LAN. An application that searches for an image forming apparatus and prints desired image data is installed in the information terminal 101. Image forming apparatuses 102 to 105 have multiple functions, such as a printing function, a scanning function, and a sending function. The image forming apparatuses may also be referred to as "information processing apparatuses", "network devices", or "devices". These devices are configured to be capable of network communication with each other over a wired LAN or a wireless LAN. The present embodiment assumes that printing processing, scanning processing, and the like are performed through IPP.

Although the present embodiment describes an image forming apparatus as an example of a device, the embodiment is not limited thereto. The embodiment can be applied when searching for and using a wide variety of devices having network connection functions, such as digital cameras, network scanner devices, 3D printers, digital signage, network cameras, and smart TVs. Also, the device to be searched for may be an information processing apparatus such as a smartphone or a PC, an automobile, a car navigation device, an IoT device such as a smart light bulb or a smart speaker, or the like.

In the present embodiment, states pertaining to IPP for the image forming apparatuses 102 to 105 will be described according to the examples of states shown in Table 1. Table 1 shows print protocol settings for the image forming apparatuses 102 to 105, as well as verification results obtained when server certificates of those apparatuses have been verified. Specifically, Table 1 indicates whether or not IPPS which uses TLS is active, whether or not IPP which does not use TLS is active, and whether or not the server certificate used when the image forming apparatus communicates using IPPS is successfully verified by the information terminal 101. In this case, the image forming apparatus 103 has a legitimate server certificate and is furthermore within a validity period, and the certificate is therefore successfully verified by the client. However, the image forming apparatus 104 uses a self-signed server certificate, and the certificate therefore fails the verification by the client; and while the image forming apparatus 105 has a legitimate server certificate, the certificate has passed its validity period, and the verification fails as a result. The server certificate held by the image forming apparatus 103 is a server certificate 801, illustrated in FIG. 8; the server certificate held by the image forming apparatus 104 is a server certificate 802, illustrated in FIG. 8; and a CA certificate held by the information terminal 101 is a CA certificate 803, illustrated in FIG. 8. Although the term "certificate" is used, the certificate is digital data, and may also be called "certificate information" or "certificate data". Note also that the Internet Printing Protocol (IPP) is an HTTP-based protocol used for printing, and can also handle print settings. IPPS is a protocol which combines Transport Layer Security (TLS) with an IPP base, and can further provide authentication (verification) of communication partners, encrypted communication, and the like. A communication partner can be authenticated by verifying the server certificate using the CA certificate, for example.

TABLE 1

| Image Forming Apparatus Print Settings and Certificate Verification | | | | |
|---|---|---|---|---|
| | IMAGE FORMING APPARATUS 102 | IMAGE FORMING APPARATUS 103 | IMAGE FORMING APPARATUS 104 | IMAGE FORMING APPARATUS 105 |
| PRINT PROTOCOL SETTINGS | IPP ACTIVE IPPS INACTIVE | IPP ACTIVE IPPS ACTIVE | IPP INACTIVE IPPS ACTIVE | IPP INACTIVE IPPS ACTIVE |
| SERVER CERTIFICATE VERIFICATION | — | SUCCESS | FAIL (SELF-SIGNED) | FAIL (OUTSIDE VALIDITY PERIOD) |

Hardware Configuration

Figure 2:
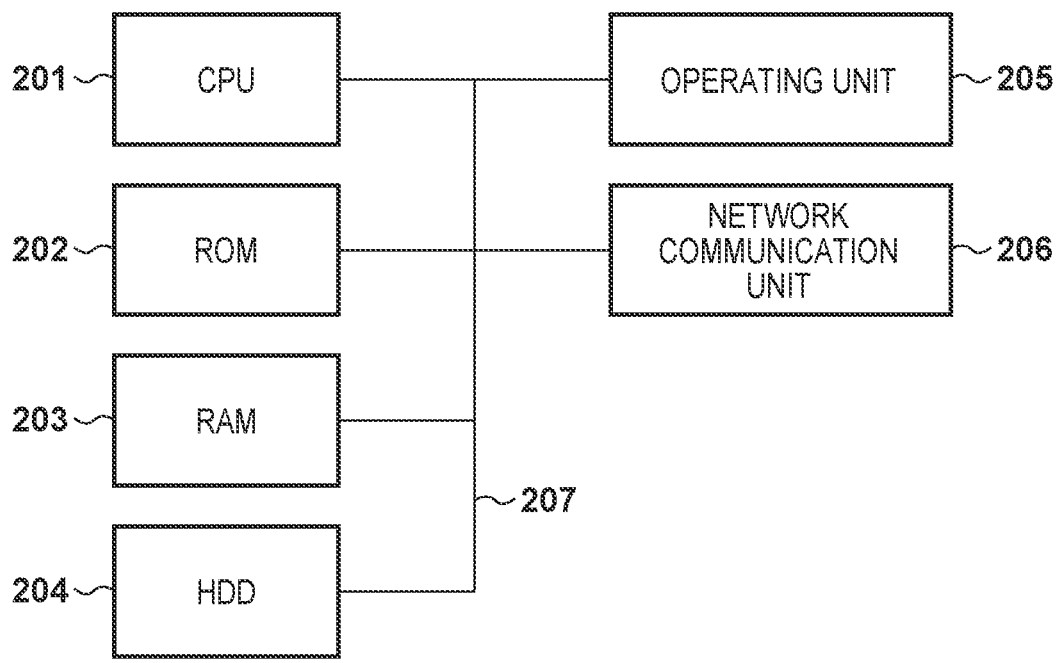
FIG. 2 is an example of a hardware configuration diagram illustrating an information terminal 101.

FIG. 2 is a block diagram illustrating the hardware configuration of the information terminal 101. A central processing unit (CPU) 201 controls various devices connected to a system bus 207 by reading out and executing control programs stored in read-only memory (ROM) 202 or an HDD 204. Random access memory (RAM) 203 is a storage device which functions as a main memory in which the control programs executed by the CPU 201 are deployed. The RAM 203 is used as a work area for the CPU 201 to execute various types of programs, as well as a temporary storage region in which various types of data are temporarily stored. Various types of data, such as image data and electronic documents, are stored in the HDD 204. Programs for various types of applications, such as an OS and a printing application, are stored in the HDD 204 as well.

In this manner, the hardware such as the CPU 201, the ROM 202, and the RAM 203 constitute what is known as a "computer". With the information terminal 101 of the present embodiment, the one CPU 201 is assumed to execute the various processes illustrated in the flowcharts described later using a single memory (the RAM 203). However, another form may be employed instead. For example, the processes in the flowcharts described later can also be executed by having a plurality of processors, RAM, ROM, and storage operating cooperatively. Some of the processing, such as the processing for verifying certificates, may be executed by cooperative operation with hardware circuitry such as a Trusted Platform Module (TPM). It is furthermore assumed that the processing for searching for a device, which will be described later, is implemented by operating cooperatively with an interface such as a network communication unit 206.

An operating unit 205 may have touch panel functionality so as to be capable of detecting touch operations made by a user, and displays images provided by various types of applications running on the information terminal 101, such as an OS and a printing application, for example, user interface (UI) screens, and the like. These displays are made under display control performed by the CPU or the like. By making a touch operation, or an input operation using a mouse or keyboard, to the operating unit 205, the user can input operating instructions to the information terminal 101. In other words, the operating unit 205 functions as a display unit that presents information to the user and an accepting unit that accepts information from the user. The network communication unit 206 is a communication module for communicating over a wireless LAN, a wired LAN, or both. The module may also have wireless communication functions such as Bluetooth (registered trademark), LTE, or the like.

Software Configuration

Figure 3:
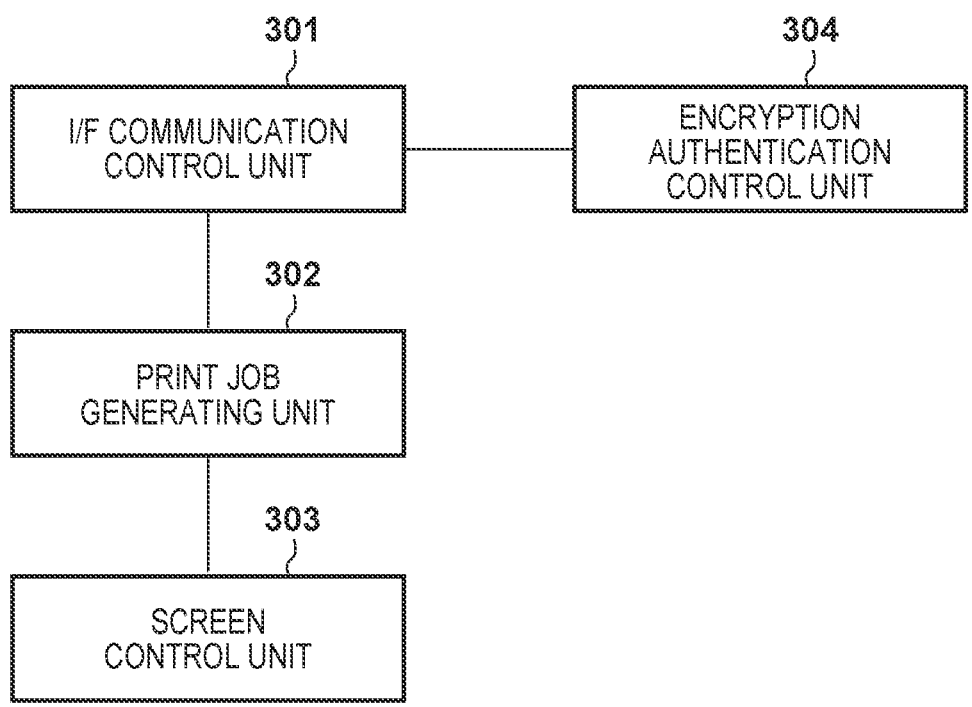
FIG. 3 is an example of a software configuration diagram illustrating the information terminal 101.

FIG. 3 is a block diagram illustrating the software configuration of the information terminal 101. An interface (I/F) communication control unit 301 determines where to allocate processing on the basis of network data received by the network communication unit 206, generates and transmits response data, and the like. An encryption authentication control unit 304 performs encryption and decryption processing for encrypted communication using TLS or the like, and furthermore performs processing for verifying communication partners using certificates. For example, a server certificate received from an image forming apparatus is verified using a CA certificate. A print job generating unit 302 generates a print job, and causes an image forming apparatus to execute the generated print job by transmitting the print job to the image forming apparatus via the network communication unit 206. A screen control unit 303 causes an operating screen provided by an application to be displayed in the operating unit 205 by controlling screens displayed in the operating unit 205. Although the present embodiment describes printing processing performed by the printing application as an example of the processing performed by the information terminal 101 communicating with an external device, the application is not limited thereto. The application may, for example, be an application that scans in tandem with an image processing apparatus, an application that sends scanned data as a fax using an image processing apparatus, or the like. The application may be a multifunction application having two or more linked functions, such as a scanning function, a printing function, and a fax function. In such a case, the configuration may be such that when scanning, a scan instruction is generated instead of the print job and transmitted to the image processing apparatus. When transmitting a fax, the configuration may be such that fax transmission data is generated in the same manner as the print job, and a fax request including that transmission data and a destination (e.g., an IPP-FAX request) is then made.

Search Sequence According to First Embodiment

The flow through which the printing application of the information terminal 101 searches for an image forming apparatus, and the flow of printing processing, according to the first embodiment will be described with reference to FIGS. 4 to 8.

Figure 5B:
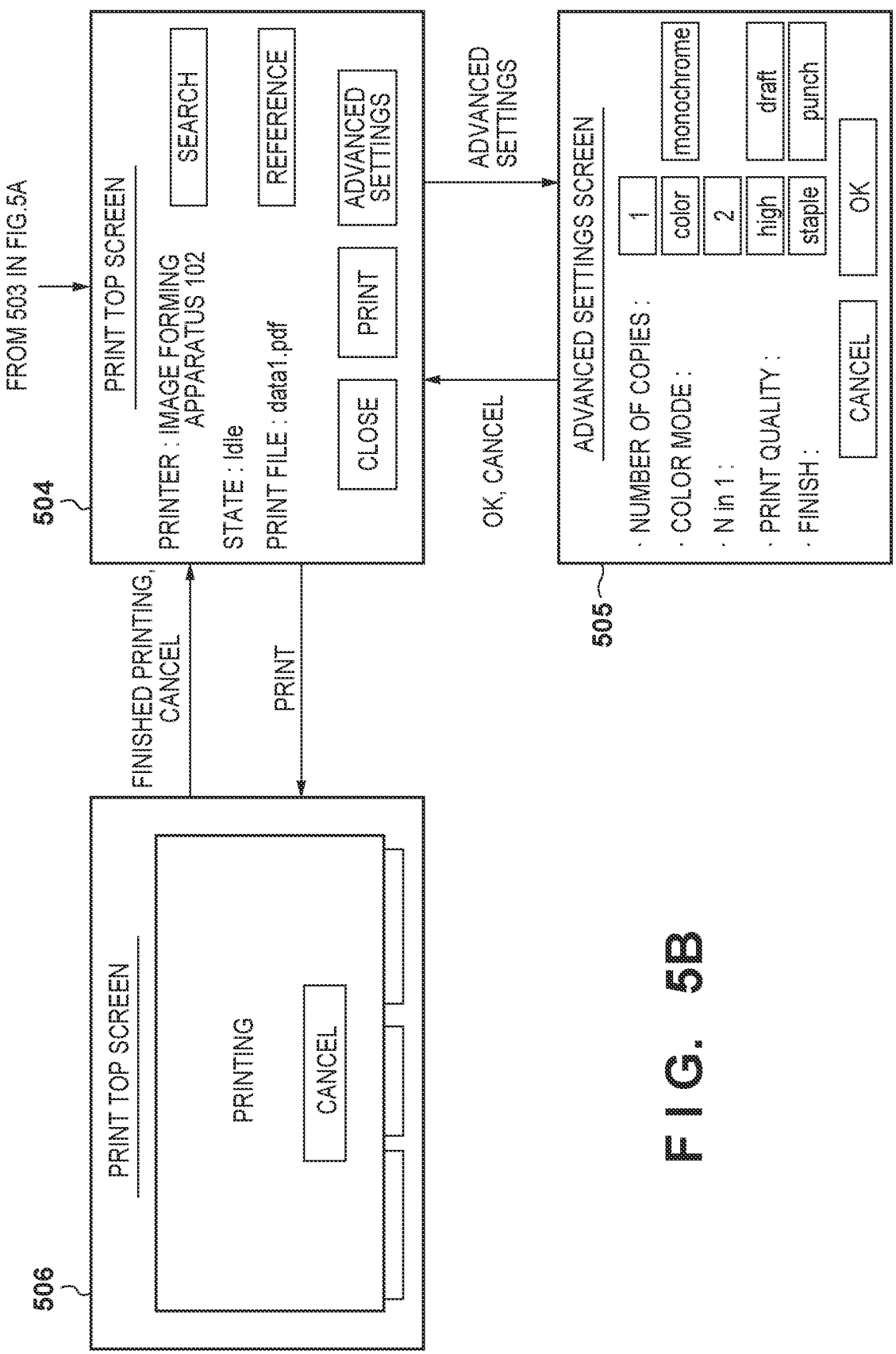

First, the user selects the printing application from the information terminal 101 (an application screen 501 in FIG. 5A). A screen 502 in FIG. 5A is an example of a print top screen of the printing application, and selecting "advanced print settings" enables advanced print settings such as a number of copies and a color mode to be made (a screen 505 in FIG. 5B). When, in the print top screen 502 in FIG. 5A, the user makes a predetermined operation such as selecting a "search" button (FIG. 4: step S401), the information terminal 101 executes processing for searching for image forming apparatuses located on a nearby network. In the following, buttons and keys which can be operated by the user, as well as display objects which present information to the user on the screen, will be collectively called "display items". Specifically, mDNS search request data 901 such as that illustrated in FIG. 9 is transmitted over the nearby network through multicast (FIG. 4: step S402). Having received the mDNS search request data 901, the image forming apparatuses transmit mDNS response data 902 (also called a "search response") such as that illustrated in FIG. 9 to the information terminal 101 (FIG. 4: step S403). Identification information and a device name of the image forming apparatus, whether IPP and IPPS settings are active or inactive, service path information, and so on are stored in the mDNS response data 902, and thus the information terminal 101 can determine whether or not the image forming apparatus in question should be accessed using IPP or IPPS. If information indicating that both IPP and IPPS are active is stored in the mDNS response data 902, the information terminal 101 prioritizes access using IPPS. However, the information terminal 101 may prioritize operating with IPP, depending on the settings.

Having received the mDNS response data 902, the information terminal 101 transmits a general information request (IPP request) 903 such as that illustrated in FIG. 9 to each image forming apparatus. The IPP Get-Printer-Attributes operation will be described as an example here. At this phase, detailed information of the image forming apparatuses has not yet been obtained, and only the minimum information needed to display a list, such as the printer name and the printer state, is requested. Each image forming apparatus transmits, to the information terminal 101, a general information response (IPP response) 904 such as that illustrated in FIG. 9. For example, with the image forming apparatus 102, only IPP is set to be active, and only an IPP service path is stored in the mDNS response as well. As such, having received the mDNS response from the image forming apparatus 102, the information terminal 101 makes a general information request to the image forming apparatus 102 through IPP (step S404). Having received the general information request through IPP, the image forming apparatus returns a general information response to the information terminal 101 through IPP (step S405). The general information (also called "general device information") includes, for example, device attributes (printer attributes), and the device attributes include a device name (printer name), device information (printer state), and the like. The same applies to IPPS accesses as well.

On the other hand, with the image forming apparatus 103, both IPP and IPPS are set to be active, and both service paths are stored in the mDNS response as well. In this case, the information terminal 101 which has received the mDNS response from the image forming apparatus 103 accesses the image forming apparatus 103 with priority given to IPPS. Likewise, the information terminal 101 attempts to access the image forming apparatuses 104 and 105 through IPPS. When accessing through IPPS, first, a TLS negotiation request is transmitted (step S406). An image forming apparatus which has received a TLS negotiation request then transmits its own server certificate to the information terminal 101 (step S407). Having received the server certificate, the information terminal 101 verifies the received server certificate using its own CA certificate (e.g., the CA certificate 803) (step S408). For example, the server certificate 801 in FIG. 8 has no problems in terms of the validity period and the certification path, and the verification therefore succeeds. On the other hand, a self-signed server certificate such as the server certificate 802, a server certificate which is past the validity period, and the like will fail the verification. If the verification succeeds, the information terminal 101 continues the search processing, and makes a general information obtainment request through IPPS (step S409). Having received the general information request through IPPS, the image forming apparatus returns a general information response to the information terminal 101 through IPPS (step S410).

Once the processing for searching for all the image forming apparatuses which have returned responses to the mDNS search request (including general information requests and detailed information requests) is complete, the information terminal 101 displays a search result list screen 503 on the basis of the received general information, as illustrated in FIG. 5A (step S411). The search result list screen 503 includes a list of device names, for example. The user then selects a desired one of the image forming apparatuses from the list (step S412). Next, the information terminal 101 transmits a detailed information request 905 such as that illustrated in FIG. 9, which requests detailed device information, to the selected image forming apparatus, through IPP or IPPS, depending on which of those protocols the image forming apparatus supports (steps S413 and S415). Once more detailed device information (called "detailed information" or "detailed device information") has been returned from the image forming apparatus that received the detailed information request 905 (steps S414 and S416), the information terminal 101 displays a print settings screen 504 on the basis of the received detailed device information (step S417). In addition to the information included in the general device information, the detailed device information includes function information indicating the functions of the device, and the like. If the device is an image forming apparatus, for example, the function information includes functions provided by the device and values which can be set for those functions (setting items), such as number of copies settings, color/black-and-white settings, print quality settings, supported document data types, and page allocation settings.

When "advanced settings" is selected in the print settings screen 504, an advanced settings screen 505 is displayed. When the user sets desired settings values for the print settings items displayed in the screen, and then instructs printing to be performed, the printing is executed, and the information terminal 101 displays a printing underway screen 506, illustrated in FIG. 5B, while the printing is underway.

Figure 7A:
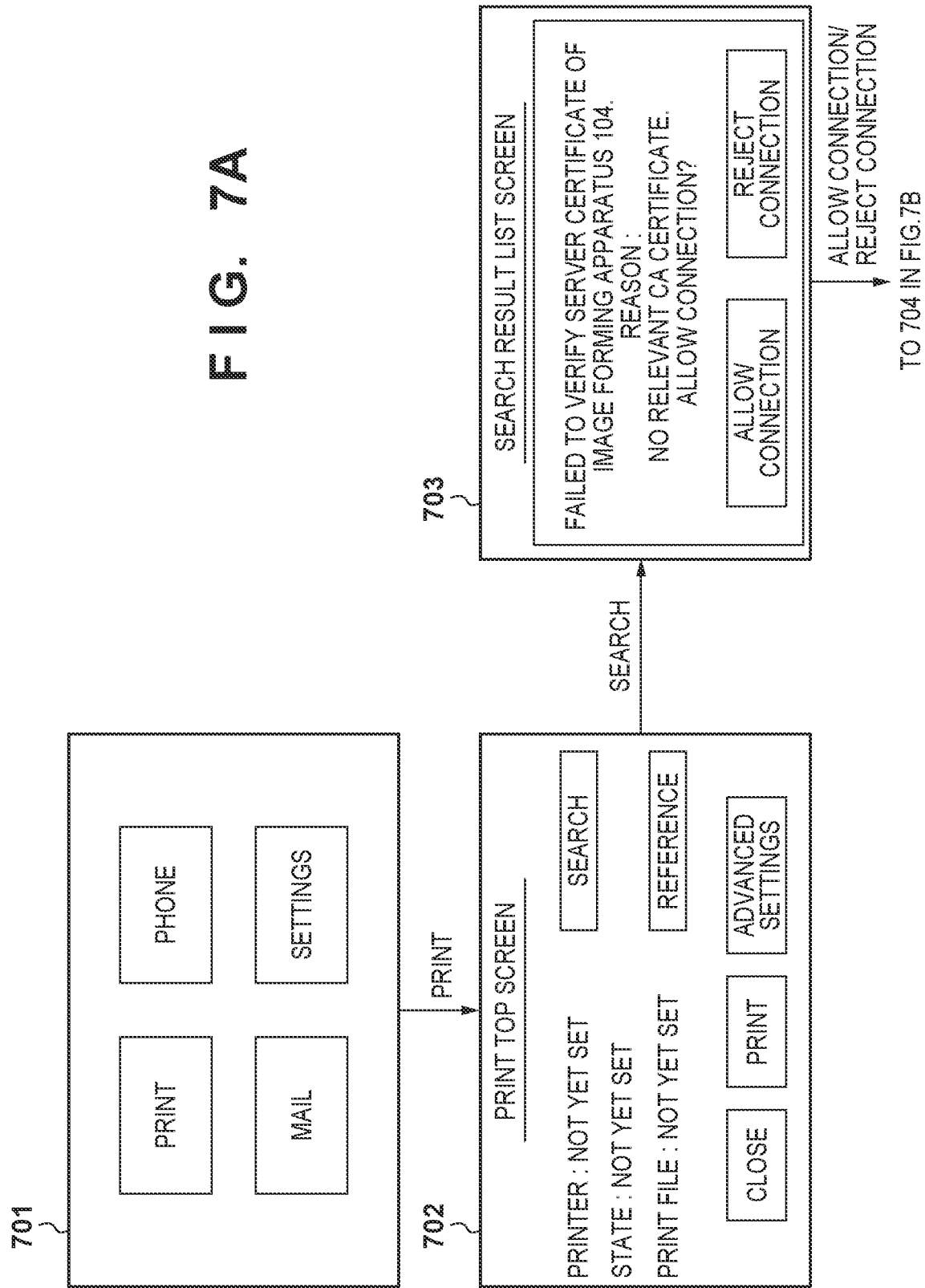
FIGS. 7A and 7B illustrate an example of a flow of the operating unit of the information terminal according to the first embodiment.
Figure 7B:
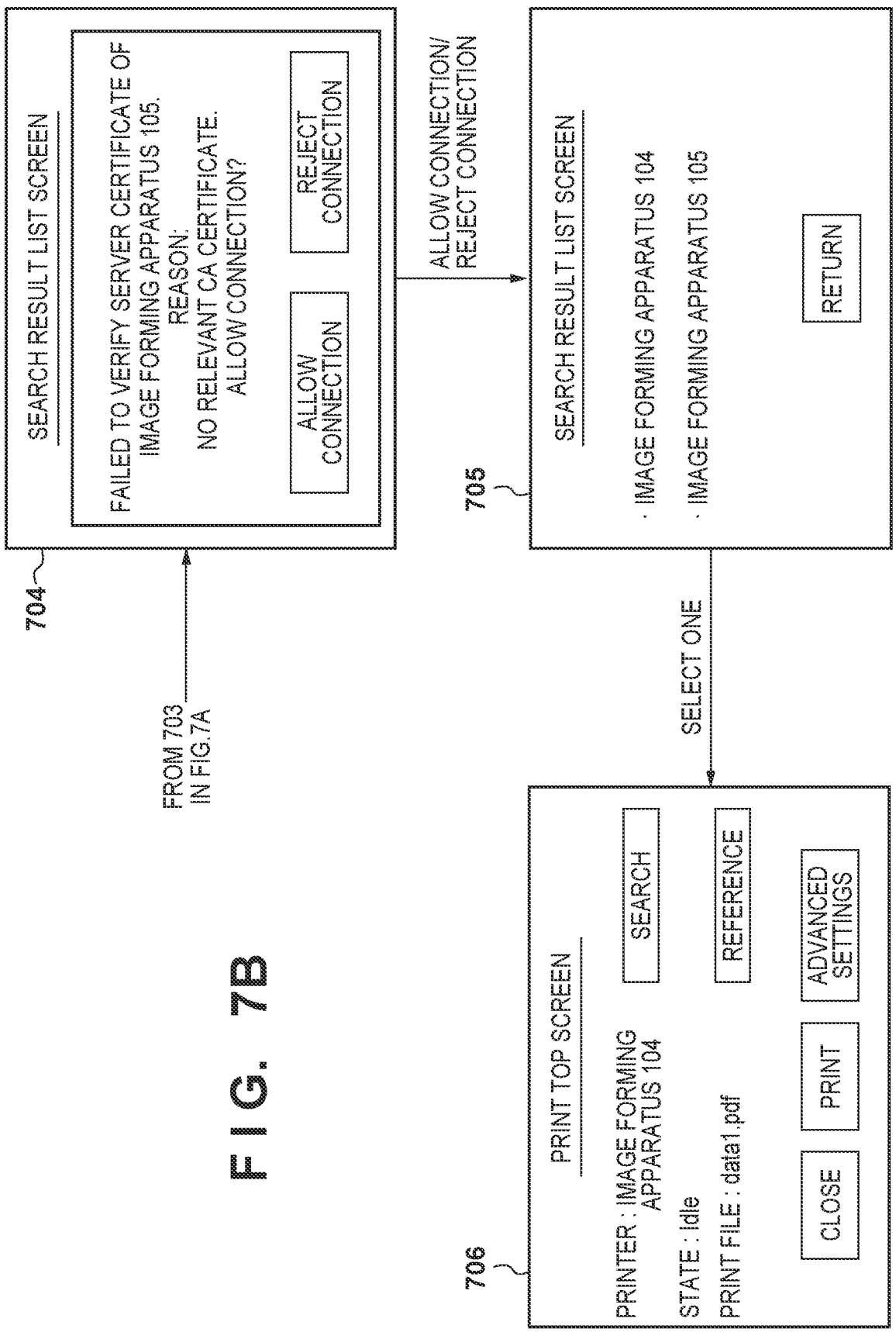

FIG. 4 illustrates a sequence in a case where the verification of the server certificate of the image forming apparatus succeeds in this manner. In contrast, if the verification has failed, a connection confirmation screen 703 which, as illustrated in FIG. 7A, confirms whether or not to allow the connection, is displayed (FIG. 6: step S604). If the user selects the option for allowing the connection in the screen (step S605), a general information request is transmitted to the image forming apparatus through IPPS (step S606). The processing from step S606 on is the same as the processing from step S409 on in FIG. 4. The connection confirmation screen is displayed for each image forming apparatus. Accordingly, if, for example, the server certificate verification fails for another image forming apparatus, a connection confirmation screen 704 is displayed after the user has made a confirmation input in the connection confirmation screen 703. The user therefore repeats the connection confirmation operations the same number of times there are image forming apparatuses for which the verification has failed. Note that the screens 701, 702, 705, and 706 in FIGS. 7A and 7B correspond to the screens 501, 502, 503, and 504, respectively, in FIGS. 5A and 5B. The content of the display in the screen 705 differs from that in the screen 503, and this is because the example illustrated in FIG. 7B is an example in which the user has made a response rejecting the connection for the image forming apparatus for which the verification has failed.

According to the first embodiment as described thus far, the user is allowed to select whether or not to allow a connection for a device, such as an image forming apparatus, for which verification has failed, and the connection is or is not established in accordance with the stated selection. This makes it possible to prevent unconditional connections with image forming apparatuses for which verification has failed.

Second Embodiment

Search Sequence Displaying Confirmation Screen During Selection

The first embodiment described an example in which the user is allowed to select whether or not to allow connections, one connection at a time. The second embodiment will describe a system for simplifying the operation flow in order to further improve the convenience for the user.

The flow of a device search according to the second embodiment will be described with reference to FIGS. 10 to 12B. The flow illustrated in FIG. 10 represents a solution in which a confirmation screen is displayed in order to select whether or not to allow a connection for an image forming apparatus selected after the user has selected one image forming apparatus from the list display.

FIG. 10 illustrates an example of a search sequence according to the second embodiment. Here, steps S401 to S405 are the same as those described earlier, and will therefore not be mentioned here. Having determined to carry out access through IPPS in accordance with the mDNS response, the information terminal 101 transmits a TLS negotiation request to the image forming apparatus (step S1001), and then receives a server certificate from the image forming apparatus (step S1002). The information terminal 101 then verifies the received server certificate using its own CA certificate (step S1003). The information terminal 101 stores the verification result in association with the image forming apparatus (step S1004). If all of the image forming apparatuses accessed through IPPS have been stored, it is also possible to store an indication of the verification has failed only for the information forming apparatuses for which the verification has failed. For example, if it is determined that the verification has failed, the verification failure is stored for that image forming apparatus. Even if the verification has failed, the user is not allowed to confirm the connection through the screen 703 at this stage; rather, a general information obtainment request is transmitted to the image forming apparatus through IPPS (step S1005). The general information is then received as a response (step S1006). Steps S1001 to S1006 are repeated for all of the image forming apparatuses, among the image forming apparatuses discovered through the search, which support IPPS. The processing up to that point is a "search phase".

Once the search phase is complete, a search result list screen 1103, indicating the image forming apparatuses which have been discovered, is displayed, as illustrated in FIG. 11A (step S1007). At this time, which image forming apparatuses do or do not use TLS, and, if an apparatus uses TLS, whether the verification has succeeded or failed, are displayed on the basis of the search results and the verification results so that the user can understand those items at a glance. For example, the image forming apparatus 102 is set not to use TLS, and thus a mark indicating that TLS is not used is displayed. On the other hand, for example, the image forming apparatus 103 uses TLS, and verification has succeeded as well, and thus a mark indicating that the apparatus can be trusted is displayed. However, although the image forming apparatuses 104 and 105 do use TLS, the verification has failed, and thus an icon of a mark indicating a warning is displayed. For example, the mark indicating that an apparatus can be trusted may be constituted by an icon that provides a sense of security to the user, such as a green mark, a symbol indicating text reading "OK" or the like, or a combination thereof. On the other hand, for example, the mark indicating a warning may be constituted by an icon that prompts the user to take caution, such as a red mark, a symbol indicating text reading "NG" or the like, or a combination thereof. Although a mark indicating that TLS is not used is provided for apparatuses that do not support TLS, the configuration is not limited thereto. A mark indicating a warning may be displayed in association with devices that do not support TLS as well. A screen 1103 indicates an example of this. This makes it easy for the user to determine whether the image forming apparatus can be trusted.

The user selects any one of the image forming apparatuses from the search result list screen 1103 illustrated in FIG. 11A (step S1008). If the image forming apparatus selected through the user operation uses TLS and is furthermore an image forming apparatus for which the server certificate verification has failed, a confirmation screen 1104 inquiring whether or not to allow the connection is displayed, as illustrated in FIG. 11B (step S1105). If the user selects the option for rejecting the connection in the confirmation screen 1104 illustrated in FIG. 11B, control is performed to return to the list screen. If, however, the user selects the option for allowing the connection in the confirmation screen 1104, the screen transitions to a print top screen 1105. Additionally, if, in the screen 1103, the image forming apparatus selected by the user does not use TLS or is an apparatus for which verification with TLS has succeeded, a detailed information obtainment request is made as indicated by step S415 in FIG. 4, without displaying the confirmation screen. Then, a print settings screen 1105 is displayed on the basis of the detailed information obtained as a response to the request. Note that the screens 1101 and 1102 in FIG. 11A are the same as the screens 501 and 502, respectively.

By displaying a screen for confirming whether or not to make a connection when an apparatus is selected from the list display in this manner, a situation where a connection is made with an image forming apparatus for which verification has failed can be avoided without harming the usability provided by the simple search flow. This makes it possible to prevent sensitive information from being leaked.

Processing Sequence of Information Terminal

Figure 12A:
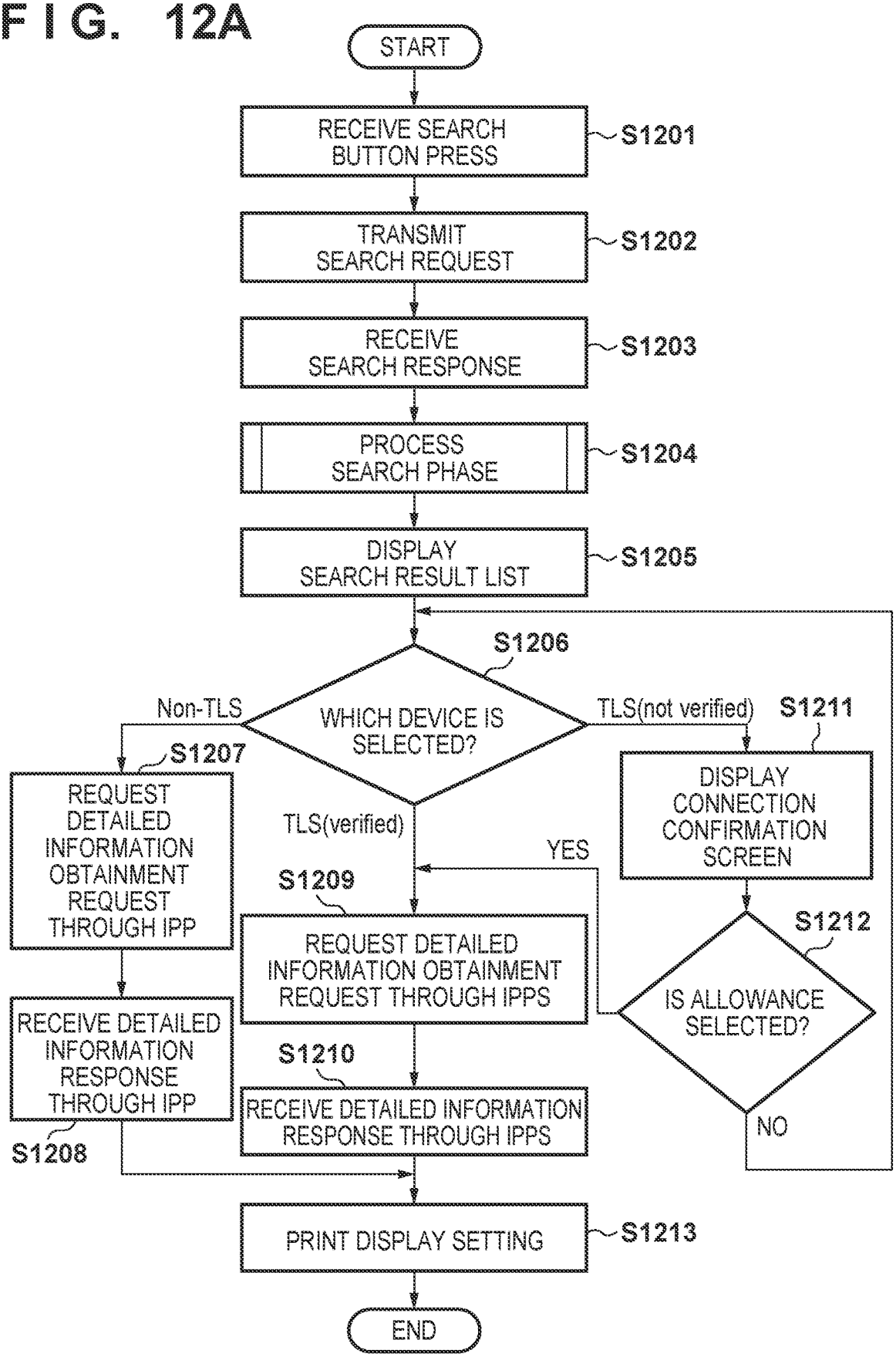
FIG. 12A is a diagram illustrating an example of a flowchart of the information terminal according to the second embodiment.

FIG. 12A is a flowchart illustrating a sequence performed when the CPU 201 of the information terminal 101 performs a search, according to the present embodiment. This sequence is implemented by the CPU 201 executing programs. The print top screen 502 is displayed in the information terminal 101, and when the CPU 201 accepts a user operation of pressing the search button in step S1201, the sequence moves to step S1202. In step S1202, the CPU 201 transmits a printer search request. This request can use a search protocol such as mDNS, for example. In step S1203, the CPU 201 receives a response to the transmitted search request. In the present embodiment, the search request is transmitted through multicast with a specified class, and thus the search response is returned from the class corresponding to the multicast destination. Here, the destination may be an image forming apparatus, for example. This response may be transmitted from a plurality of terminals, in accordance with the number of devices serving as destinations. In step S1204, the CPU 201 executes search phase processing. This processing will be described later with reference to FIG. 12B. Once this processing has ended, in step S1205, the CPU 201 displays the search result list screen 1103 illustrated in FIG. 11A in the operating unit 205. In step S1206, the CPU 201 accepts the selection of a given one image forming apparatus by the user. If the selected image forming apparatus is not TLS-compliant, such as the image forming apparatus 102 (that is, if the apparatus is not IPPS-compliant), in step S1207, the CPU 201 transmits a detailed information obtainment request to the selected device through IPP. In step S1208, the CPU 201 receives the detailed information as a response, and in step S1213, the print settings screen 1105 is displayed in the operating unit 205.

On the other hand, if the image forming apparatus selected in step S1206 is TLS-compliant (that is, is IPPS-compliant) and has been successfully verified, as is the case with the image forming apparatus 103, in step S1209, the CPU 201 transmits a detailed information obtainment request to the selected device through IPPS. Then, in step S1210, the CPU 201 receives the detailed information as a response, and in step S1213, the print settings screen 1105 is displayed in the operating unit 205.

On the other hand, if the image forming apparatus selected in step S1206 is TLS-compliant but has not been successfully verified, as is the case with the image forming apparatus 104, in step S1211, the CPU 201 displays the connection confirmation screen 1104 in the operating unit 205. In step S1212, the CPU 201 determines whether the user has opted to continue the connection, or to reject the connection. If the user has opted to reject the connection, the sequence returns to step S1205, where the CPU 201 once again stands by for the user to select a given one image forming apparatus from the list of search results. However, if the user has opted to allow the connection, the sequence moves to step S1209, where the CPU 201 performs the same processing as that described earlier.

Figure 12B:
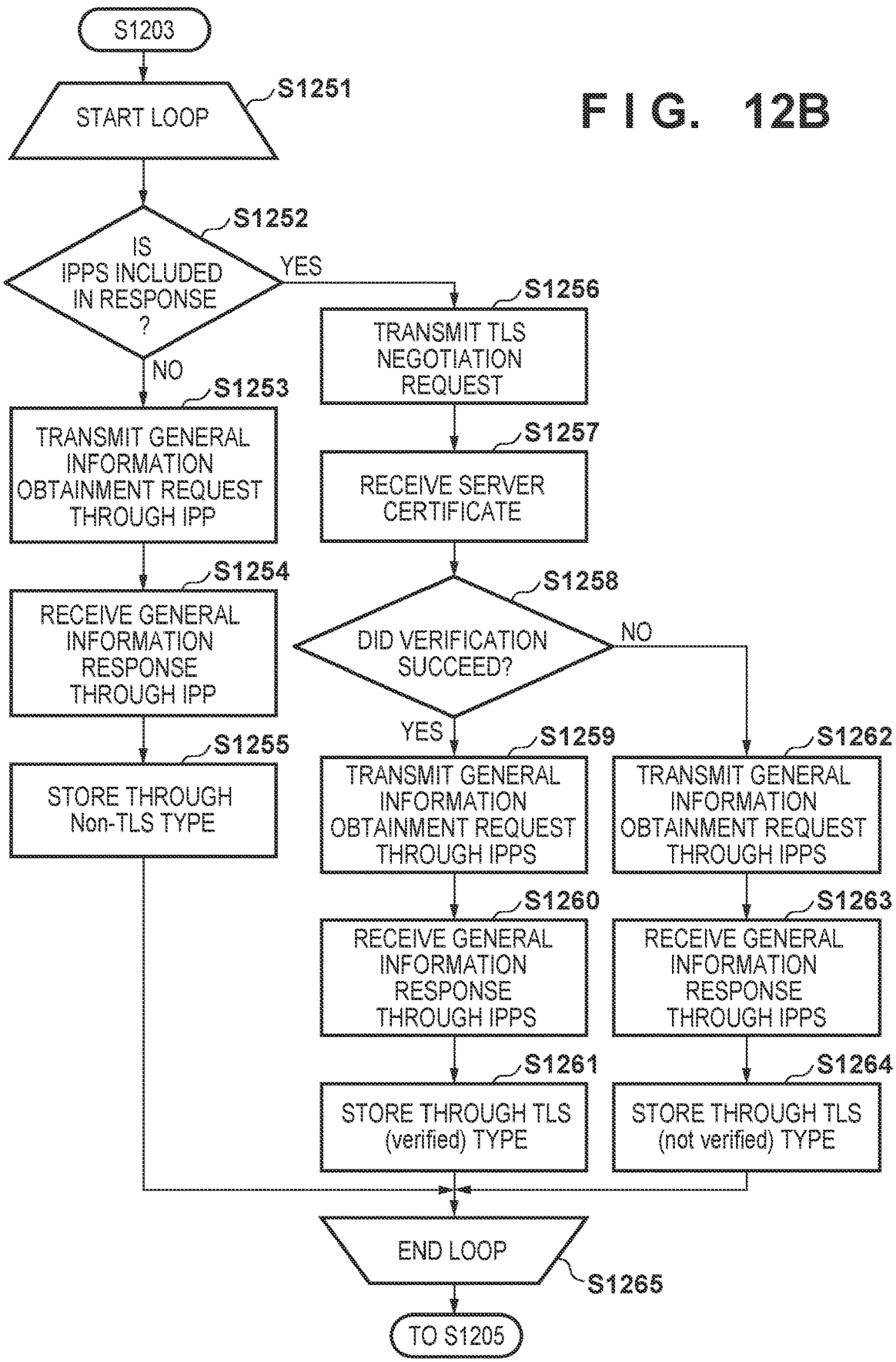
FIG. 12B is a diagram illustrating an example of a flowchart of the information terminal according to the second embodiment.

FIG. 12B is a flowchart illustrating the search phase processing performed by the CPU 201 of the information terminal 101 according to the present embodiment. This flowchart repeats the processing between steps S1251 and S1265 for each terminal which has transmitted the response received in step S1203. First, in step S1252, the CPU 201 determines whether information indicating whether or not the image forming apparatus supports IPPS is included in the response to the search request. If it is determined that IPPS is not supported, in step S1253, the CPU 201 transmits a general information obtainment request to the image forming apparatus through IPP. Then, in step S1254, the CPU 201 receives a general information obtainment response from the image forming apparatus. Next, the CPU 201 stores the information indicating that the image forming apparatus does not use TLS in association with the identification information of the image forming apparatus from which the response was transmitted. On the basis of the stored information, in step S1205, a result list is displayed in the operating unit 205 so that it can be understood that the corresponding image forming apparatus does not use TLS. For example, the phrase "NON-TLS", or an icon or mark which makes it possible to see that TLS is not used at a glance, is displayed, as is the case with the image forming apparatus 102 in the search result list screen 1103.

On the other hand, if it is determined in step S1252 that IPPS is supported, in step S1256, the CPU 201 transmits a TLS negotiation request to the image forming apparatus. During the negotiation process, in step S1257, the CPU 201 receives the server certificate from the image forming apparatus. Having received the server certificate, the CPU 201 performs processing for verifying the server certificate using its own CA certificate in step S1258, and determines the verification result, i.e., whether or not the verification has succeeded. If the verification has succeeded, in step S1259, the CPU 201 transmits the general information obtainment request to the image forming apparatus through IPPS. Then, in step S1260, the CPU 201 receives a general information obtainment response from the image forming apparatus. Next, the CPU 201 stores information indicating that the image forming apparatus uses TLS and that the verification has succeeded in association with the identification information of the image forming apparatus from which the response was transmitted. On the basis of the stored information, in step S1205, a result list is displayed in the operating unit 205 so that it can be understood that the corresponding image forming apparatus uses TLS and that the verification has succeeded. For example, the phrase "TLS (Verified)", or an icon or mark which makes it possible to see at a glance that highly-reliable encrypted communication can be performed using TLS, is displayed, as is the case with the image forming apparatus 103 in the search result list screen 1103.

Additionally, even if in step S1258 it is determined that the verification has failed, in step S1262, the CPU 201 transmits the general information obtainment request to the image forming apparatus through IPPS. Then, in step S1263, the CPU 201 receives a general information obtainment response from the image forming apparatus. Next, the CPU 201 stores information indicating that the image forming apparatus uses TLS and that the verification has failed in association with the identification information of the image forming apparatus from which the response was transmitted. On the basis of the stored information, in step S1205, a result list is displayed in the operating unit 205 so that it can be understood that the corresponding image forming apparatus uses TLS and that the verification has failed. For example, the phrase "TLS (Not Verified)", or an icon or mark which makes it possible to see at a glance that TLS is being used but verification was not successful, is displayed, as is the case with the image forming apparatus 104 in the search result list screen 1103.

As described above, in the present embodiment, before the list is displayed, the processing continues even if the verification has failed (step S1262); furthermore, after the user has selected a given one of the image forming apparatuses, the confirmation screen is displayed for the selected image forming apparatus (step S1211).

Note that in the present embodiment, the verification result, e.g., an image forming apparatus for which verification has failed, is stored (step S1004), and if that image forming apparatus is selected from the list, the confirmation screen is displayed at that point in time (step S1211). This may be implemented in a different manner, however. For example, image forming apparatuses which support IPPS, discovered before the image forming apparatus is selected, are verified as in the first embodiment, with the connection continuing automatically rather than displaying the confirmation screen even when verification fails, and a list of the discovered image forming apparatuses being displayed. If an image forming apparatus has been selected after the list is displayed, the verification may be performed again for the selected image forming apparatus, with control being performed so that the confirmation screen is necessarily displayed if the verification has failed. After the list is displayed, the IPPS communication starts again from the TLS negotiation and server certificate sending sequence, and thus the same effects as those provided by the operation flow illustrated in FIGS. 11A and 11B can be achieved using this method as well. If, when an image forming apparatus is selected, the verification result for that image forming apparatus is a failure, the confirmation screen may be displayed to allow the user to select whether or not to make the connection.

According to the present embodiment, through the configuration and sequences described above, the user is requested to perform confirmation when verification fails for a selected device (image forming apparatus). As such, the burden on the user is essentially limited to inputting a confirmation for the selected device, which lightens the burden on the user. Additionally, like the first embodiment, unconditionally connecting to a device for which verification has failed can be prevented.

Third Embodiment

Search Sequence Performed Only Using mDNS in Search Phase

A search sequence according to the present embodiment will be described with reference to FIGS. 13 to 15. In the present embodiment, the sequence for obtaining the general information is eliminated from the search phase prior to the list display, and the detailed information of each image forming apparatus is obtained from search results using mDNS.

Figure 14A:
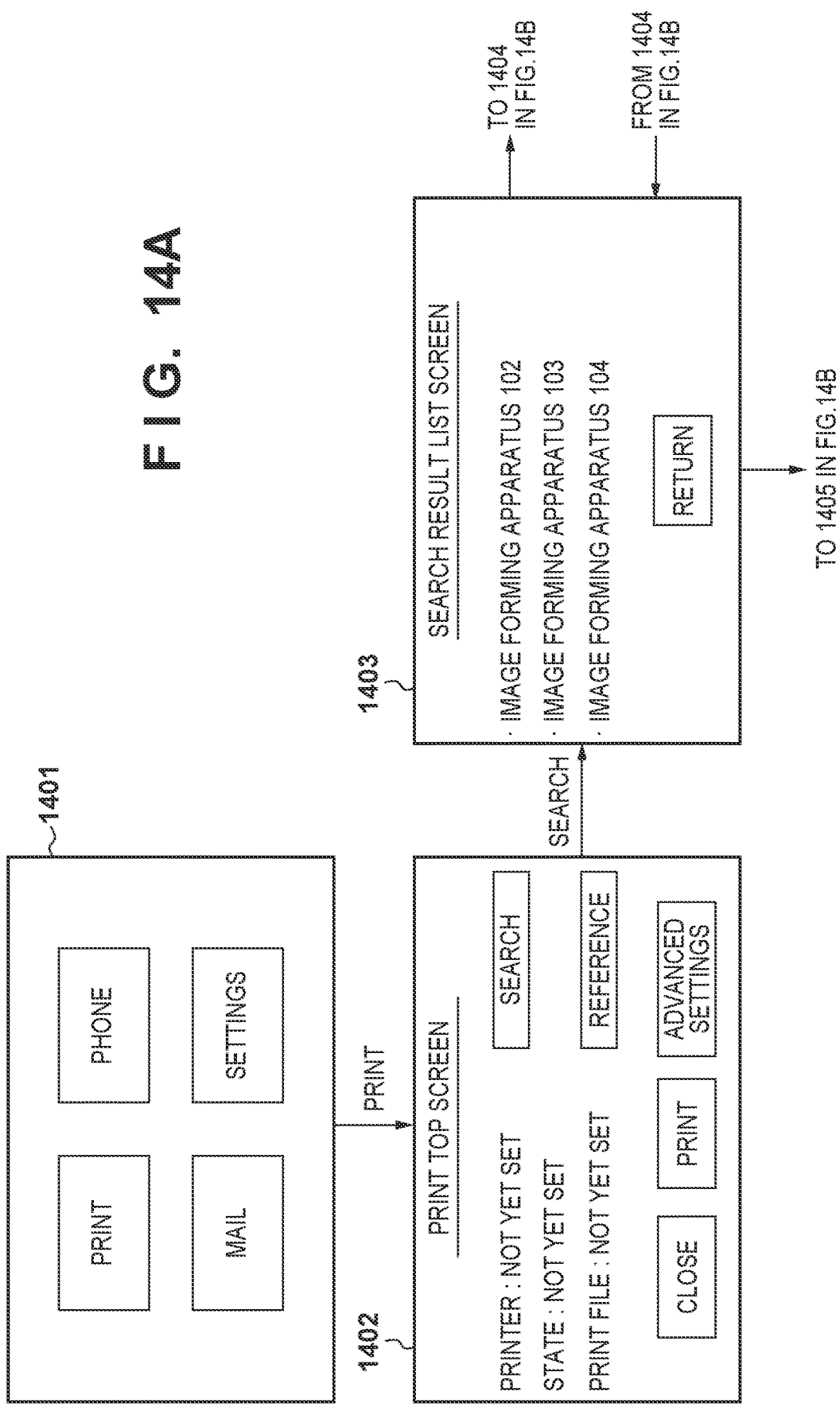
FIGS. 14A and 14B illustrate an example of a flow of the operating unit of the information terminal according to the third embodiment.
Figure 14B:
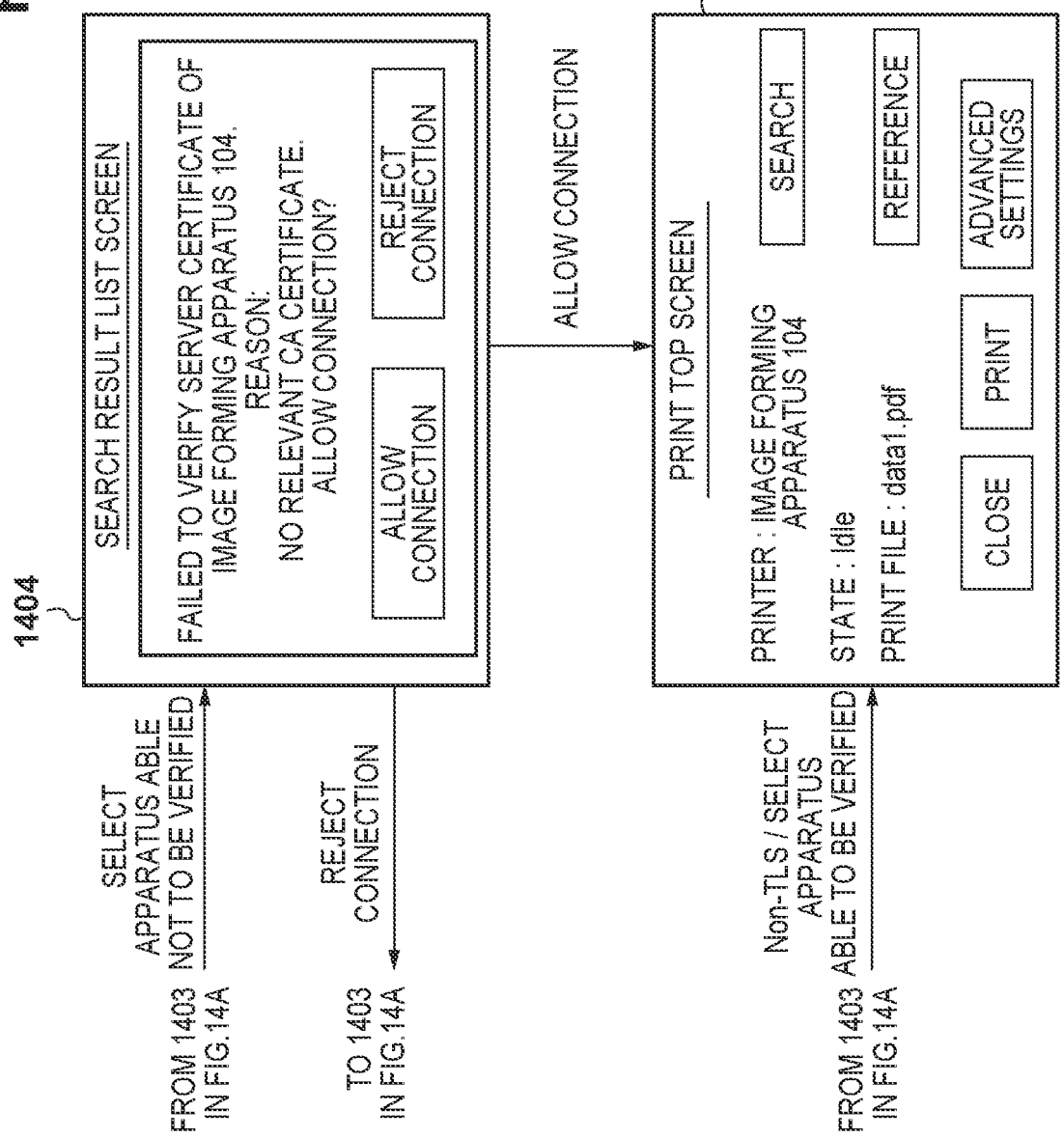

Steps S1301 to S1303 are the same as steps S401 to S403. In the present embodiment, a search result list screen 1403, as illustrated in FIG. 14A, is displayed at the point in time when this mDNS response is received (step S1304). Because IPPS communication is not being performed at this point in time, it cannot be determined whether the verification has succeeded, and thus an indicator of the reliability, such as an icon or a mark, cannot be displayed in the same manner as in the search result list screen 1103 illustrated in FIG. 11A. However, as long as simply displaying a list, it is sufficient to obtain the minimum required information, such as the device name and state, and such information can be obtained from the information held in the mDNS response (the search response). The list can therefore be displayed at the point in time when the mDNS response is complete. The information terminal 101 accepts the selection of a given one of the image forming apparatuses from the displayed list (step S1305), and if the selected image forming apparatus does not use TLS, the information terminal 101 makes a detailed information obtainment request through IPP (step S1306). Once the detailed information is received as a response (step S1307), a print settings screen is displayed (step S1315; a screen 1405). If the selected image forming apparatus uses TLS, first, the information terminal 101 requests a TLS negotiation (step S1308), receives the server certificate from the image forming apparatus (step S1309), and verifies the server certificate (step S1310). If the verification fails here, the confirmation screen for the user to select whether or not to allow the connection is displayed (step S1311; a screen 1404 in FIG. 14B). If the user allows the connection (step S1312) or the verification succeeds, the information terminal 101 makes a detailed information obtainment request through IPPS (step S1313). Once the detailed information is received as a response (step S1314), the print settings screen is displayed (step S1315; the screen 1405 in FIG. 14B). When "advanced settings" is selected in the screen 1405, the advanced settings screen 505 is displayed on the basis of the detailed information. Note that the screens 1401 and 1402 in FIG. 14A are the same as the screens 701 and 702, respectively, in FIG. 7A.

Figure 15:
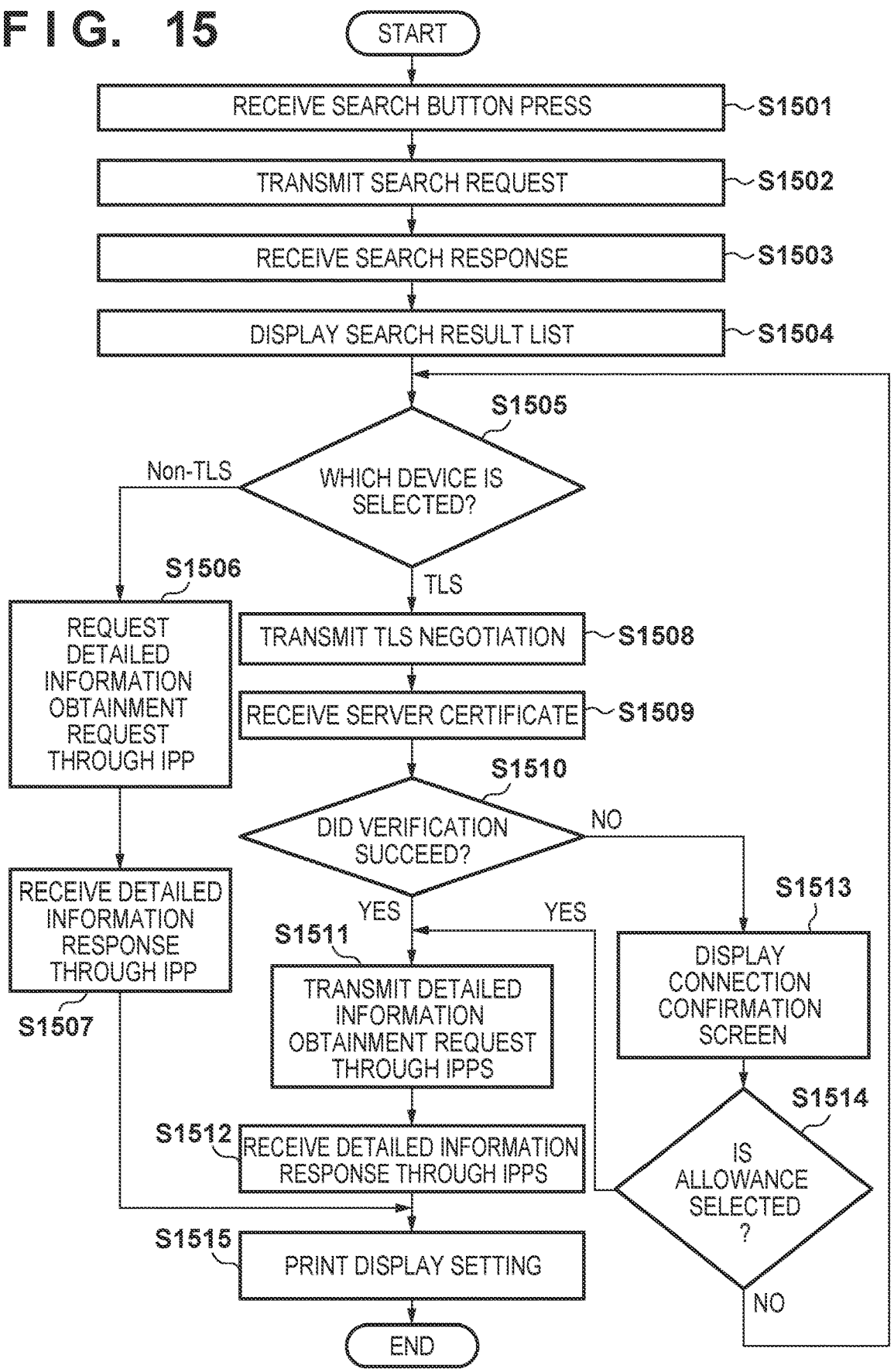
FIG. 15 is a diagram illustrating an example of a flowchart of the information terminal according to the third embodiment.

FIG. 15 is a flowchart illustrating a sequence performed when the information terminal 101 performs a search, according to the present embodiment. The differences from FIGS. 12A and 12B will be described here. In the present embodiment, when an mDNS search performed in response to a search start instruction ends (steps S1501 to S1503), a list of the search results is displayed on the basis of the information obtained through mDNS without performing processing equivalent to step S1204 (step S1504).

Then, when one of the image forming apparatuses is selected from the list, processing for the detailed information obtainment request is performed through IPP if the selected image forming apparatus does not support IPPS (step S1506). However, if IPPS is supported, the sequence moves to step S1508.

In steps S1508 to S1510, the CPU 201 executes the same processing as that of steps S1256 to S1258 in FIG. 12B, and verifies the server certificate of the selected image forming apparatus. If it is determined in step S1510 that the verification has succeeded, the sequence moves to step S1511, whereas if the verification has not succeeded (has failed), the sequence moves to step S1513.

In steps S1511 to S1512, the CPU 201 executes the same processing as in steps S1209 to S1210 in FIG. 12A, and obtains capability information (detailed information) of the image forming apparatus.

Then, in step S1515, the CPU 201 displays the print settings screen 1405 in the operating unit 205.

If it is determined in step S1510 that the verification has failed, the confirmation screen is displayed (step S1513), and an inquiry is made with the user as to whether to make the connection. If "allow" is selected, the sequence moves to step S1511, and if "reject" is selected, the sequence returns to step S1505.

As described thus far, according to the present embodiment, control is performed so that only mDNS is executed in the search phase, and searches through IPPS, which require verification, are performed after the user has selected an apparatus. Accordingly, accessing an image forming apparatus which poses a security risk can be avoided, without impairing the simple operability, by displaying a confirmation screen when accessing image forming apparatuses which have failed the verification, which makes it possible to prevent sensitive information from being leaked. Additionally, the processing for obtaining the general information through IPP can be skipped, which makes it possible to accelerate the processing.

Fourth Embodiment

Search Sequence Using Collective Confirmation Screen

Figure 17A:
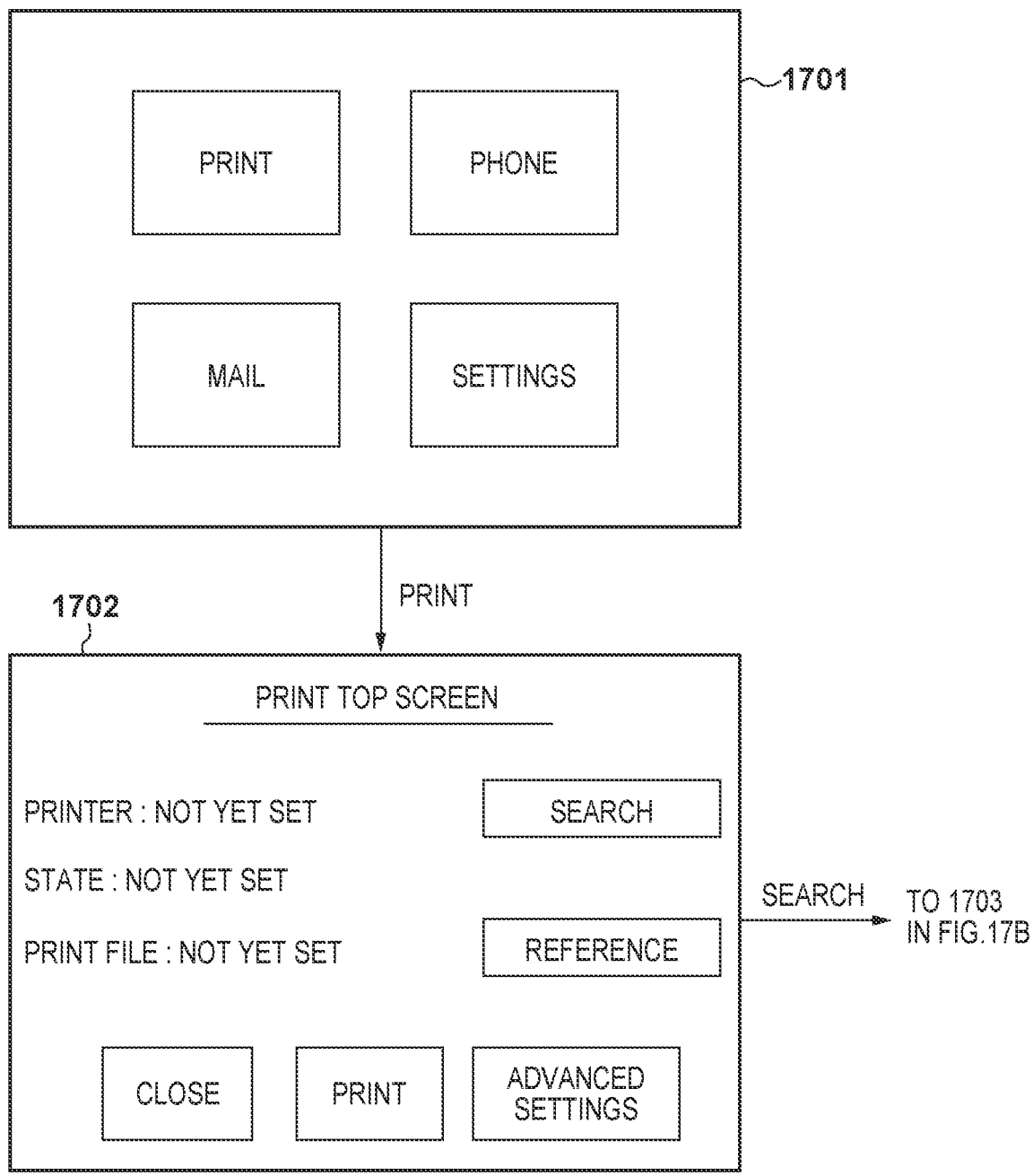
FIGS. 17A-17C illustrate an example of a flow of the operating unit of the information terminal according to the fourth embodiment.
Figure 17B:
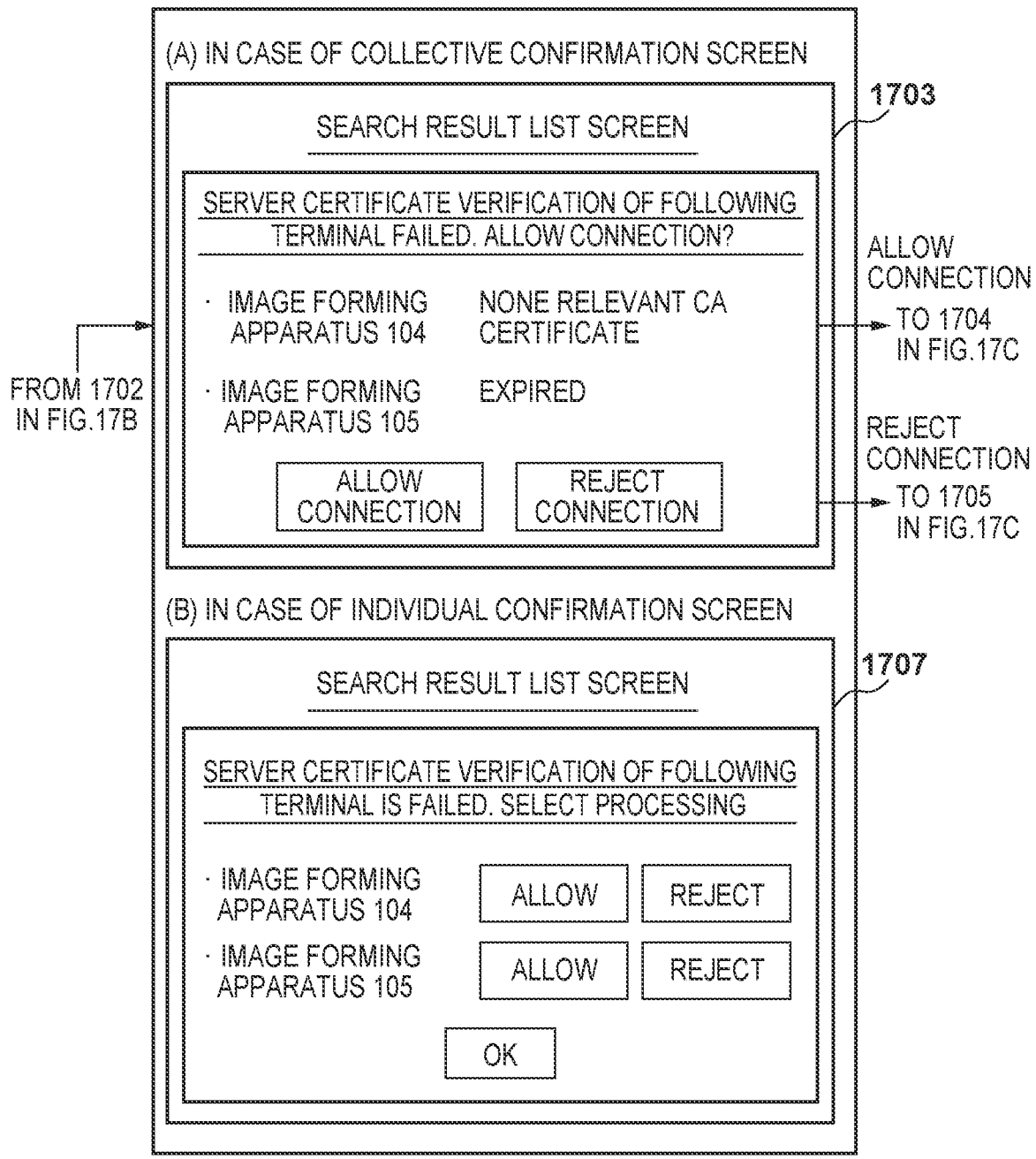
Figure 17C:
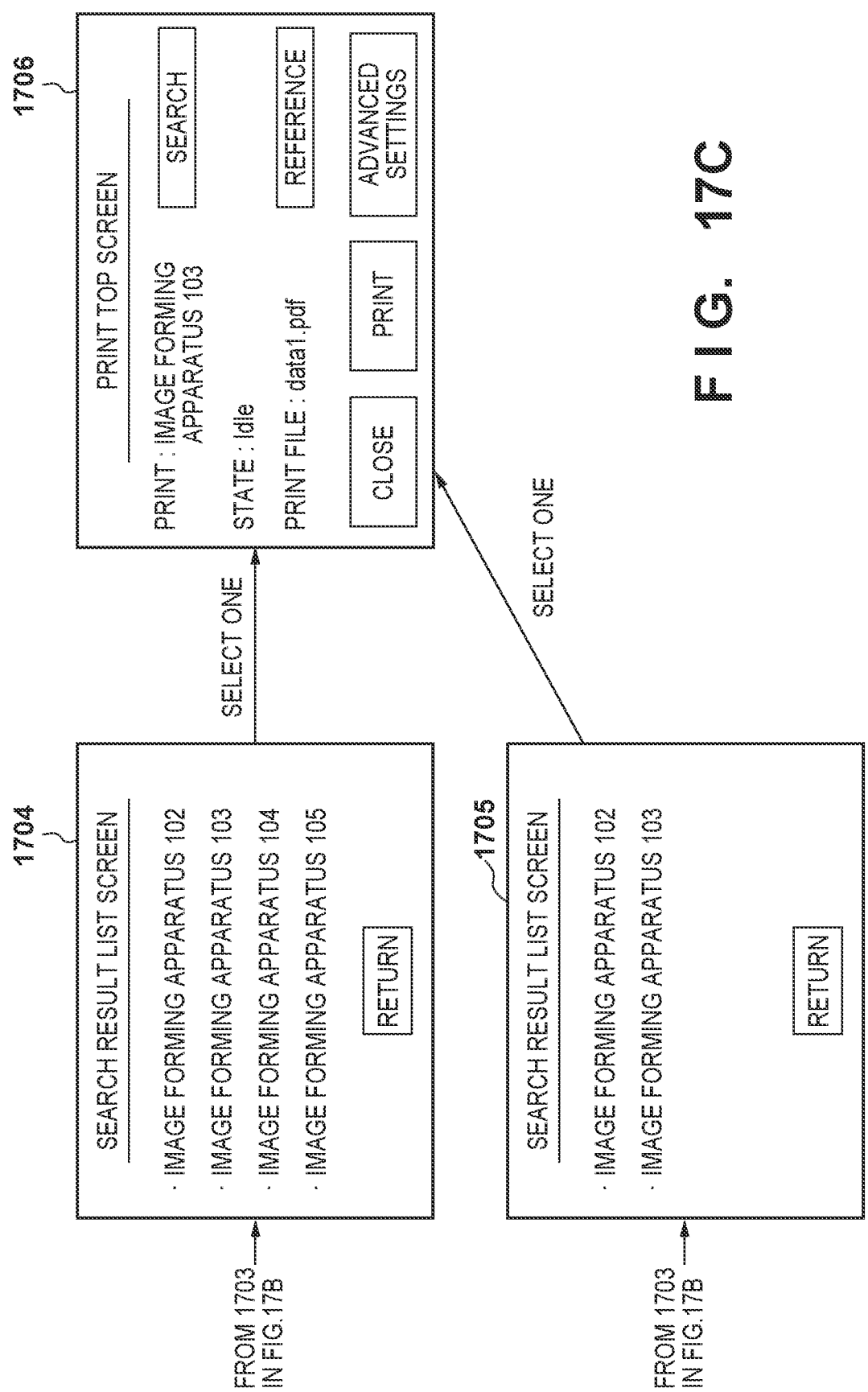

A search sequence according to the present embodiment will be described with reference to FIGS. 16 to 18. FIG. 16 is a sequence chart illustrating a sequence performed during a search according to the present embodiment. Until partway through, the sequence is the same as the sequence from the start to step S1003 (verification of the TLS server certificate)

in FIG. 10, and thus descriptions thereof will be omitted. The verification results are stored, and if the verification results indicate that there are image forming apparatuses for which the verification has failed, a confirmation screen for confirming whether or not to collectively allow those apparatuses to be connected to is displayed, as illustrated in FIGS. 17A-17C (step S1601). The names of all of the image forming apparatuses for which verification has failed are given in a screen 1703. Here, if the user has opted to reject the connection (step S1602), the information terminal 101 deletes the image forming apparatuses for which connections have been rejected from the list of discovered devices (step S1603). Next, as illustrated in FIGS. 17A-17C, a list of only the image forming apparatuses which do not use TLS or for which verification has succeeded is displayed so as to exclude the image forming apparatuses for which verification has failed (step S1606). On the other hand, if the user has opted to allow the connections in the screen 1703 (step S1604), the information terminal 101 displays a list of all of the search results, including the image forming apparatuses for which verification has failed (a screen 1704 in FIG. 17C). Then, after the user has selected a given one of the apparatuses from the displayed list, the flow is the same as that from step S413 on. Although the screen 1703 in FIG. 17B displays a screen for selecting whether to collectively allow or reject connections, it may instead be possible to allow or reject connections individually, as indicated by a screen 1707 in FIG. 17B. If the connection is rejected, the image forming apparatus for which verification has failed in step S1603 is deleted from the search result list, but if the connection is allowed, the image forming apparatus for which verification has failed may be added to the search result list. In this case, the original list is a list in which the image forming apparatuses for which verification has failed have been excluded from the list of discovered image forming apparatuses.

Figure 18:
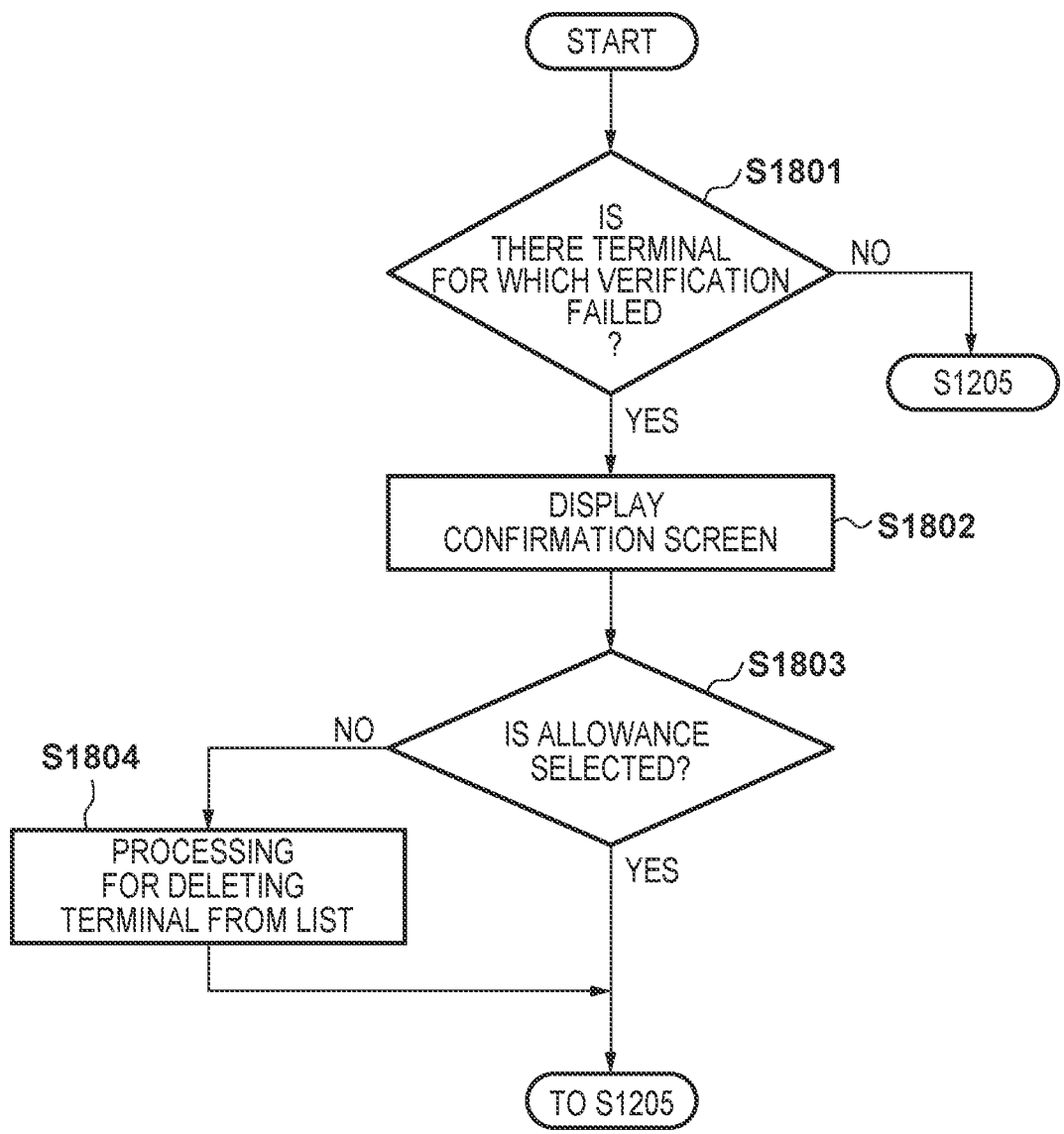
FIG. 18 is a diagram illustrating an example of a flowchart of the information terminal according to the fourth embodiment.

FIG. 18 is a flowchart illustrating a sequence performed when the information terminal 101 performs a search, according to the present embodiment. When, in step S1801 of FIG. 18, the CPU 201 determines that there is even one image forming apparatus for which verification has failed, the sequence moves to step S1802. When there is not even one such apparatus, the sequence branches to step S1205 of FIG. 12A. In step S1802, the CPU 201 displays the collective confirmation screen 1703 illustrated in FIG. 17B. In step S1803, the CPU 201 determines whether or not the user has opted to allow the connection in the collective confirmation screen 1703, and if the user has opted to allow, the sequences moves to the display processing of step S1205 in FIG. 12A. On the other hand, if the user has opted to reject the connection, the sequence moves to step S1804.

In step S1804, the CPU 201 deletes the image forming apparatus for which the server certificate verification has failed from the list of discovered image forming apparatuses. Once the deletion is complete, the sequence moves to step S1205 of FIG. 12A, and stands by for the processing through which the user selects an image forming apparatus.

By displaying a collective confirmation screen once when a search is executed using the search button in this manner, a situation where a connection is made can be suppressed without a confirmation screen being displayed multiple times and without warning the user of image forming apparatuses having server certificates which cannot be confirmed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-177783, filed Sep. 27, 2019 which is hereby incorporated by reference herein in its entirety.

What is claimed is:

1. A client terminal comprising:
at least one processor that executes instructions to:
search for devices connected to a network;
display a screen for selecting a device to be used from among devices discovered through the search;
perform a process for verifying a certificate received from a device, among the devices discovered through the search, that is able to perform encrypted communication;
in a state where the device selected through the screen is able to perform encrypted communication and for which a verification result of processing for verifying the certificate received from the selected device is a failure, inquire with a user as to whether to allow or reject communication with that device, wherein the screen is configured to include information indicating the verification result;
obtain information of the selected device by communicating with the device in a state where a user operation for allowing the communication has been made in response to the inquiry; and
perform control for not establishing encrypted communication with the selected device in a state where a user operation for rejecting the communication has been made.

2. The client terminal according to claim 1, wherein the screen is configured to include the information indicating the verification result as information in association with the selected device.

3. The client terminal according to claim 2, wherein the at least one processor performs the inquiry in a case where the verification result is a failure.

4. The client terminal according to claim 1, wherein the screen further displays a display item that sets, as the selected device to be used, a device that has been discovered through the search but that does not support encrypted communication.

5. The client terminal according to claim 1, wherein:
the devices to be searched for are image processing apparatuses, and
the client terminal communicates with the selected device to be used, which is one of the image processing apparatuses, and causes the selected device to perform printing processing or scanning processing.

6. The client terminal according to claim 1, wherein a protocol used in the search includes at least multicast Domain Name Service (mDNS).

7. An information processing apparatus comprising:
at least one processor that executes instructions to:
start a search for devices connected to a network in a state where a predetermined user operation is accepted;
display a screen for selecting a device to be used from among devices discovered through the search; and
in a state where the device selected through the screen is able to perform encrypted communication and for which a verification result of processing for verifying a certificate received from the selected device is a failure, inquire with a user as to whether to allow or reject communication with that device,
in a state where a response of rejecting communication has been received from the user as a response to the inquiry, configure the screen to include a display item corresponding to another device for which another verification result of processing for verifying a certificate received from the another device is not a failure, and to not include a display item corresponding to any device for which the verification result for the certificate is a failure.

8. The information processing apparatus according to claim 7, wherein the at least one processor executes the instructions to obtain information of the selected device.

9. The information processing apparatus according to claim 8, wherein the at least one processor, in a state where a response of allowing communication has been received from the user as a response to the inquiry, even in a case where the selected device for which the verification result is a failure, obtains the information of the selected device in a case where the selected device has been discovered through the search processing started in response to the predetermined user operation being accepted.

10. A method for a client terminal, the method comprising:
searching for devices connected to a network;
displaying a screen for selecting a device to be used from among devices discovered through the search;
performing a process for verifying a certificate received from a device, among the devices discovered through the search, that is able to perform encrypted communication;
in a state where the device selected through the screen is able to perform encrypted communication and for which a verification result of processing for verifying the certificate received from the selected device is a failure, inquiring with a user as to whether to allow or reject communication with that device, wherein the screen is configured to include information indicating the verification result;
obtaining information of the selected device by communicating with the selected device in a state where a user operation for allowing the communication has been made in response to the inquiring; and
performing control for not establishing encrypted communication with the selected device in a state where a user operation for rejecting the communication has been made.

11. The method according to claim 10, wherein the screen is configured to include the information indicating the verification result as information in association with the selected device.

12. A non-transitory computer-readable storage medium storing a program executable by a computer of a client terminal to perform a method comprising:
searching for devices connected to a network;
displaying a screen for selecting a device to be used from among devices discovered through the searching;
performing a processing for verifying a certificate received from a device, among the devices discovered through the search, that is able to perform encrypted communication;
in a state where the device selected through the screen is able to perform encrypted communication and for which a verification result of processing for verifying the certificate received from the selected device is a failure, inquiring with a user as to whether to allow or reject communication with that device, wherein the screen is configured to include information indicating the verification result;
obtaining information of the selected device by communicating with the selected device in a state where a user operation for allowing the communication has been made in response to the inquiring; and
performing control for not establishing encrypted communication with the selected device in a state where a user operation for rejecting the communication has been made.

13. The non-transitory computer-readable storage medium according to claim 12, wherein the screen is configured to include the information indicating the verification result as information in association with the selected device.

* * * * *